United States Patent [19]
Kolluru

[11] Patent Number: 6,108,633
[45] Date of Patent: *Aug. 22, 2000

[54] AUDIO DECODER CORE CONSTANTS ROM OPTIMIZATION

[75] Inventor: Mahadev S. Kolluru, Santa Clara, Calif.

[73] Assignee: LSI Logic Corporation, Milpitas, Calif.

[ * ] Notice: This patent is subject to a terminal disclaimer.

[21] Appl. No.: 09/062,598

[22] Filed: Apr. 17, 1998

Related U.S. Application Data

[63] Continuation-in-part of application No. 08/642,520, May 3, 1996.
[51] Int. Cl.[7] .................................................. G10L 19/00
[52] U.S. Cl. .......................................... 704/500; 704/270
[58] Field of Search .................................... 704/270, 278, 704/500

[56] References Cited

U.S. PATENT DOCUMENTS

| | | | |
|---|---|---|---|
| 5,126,726 | 6/1992 | Howard et al. | 340/728 |
| 5,448,310 | 9/1995 | Kopet et al. | 348/699 |
| 5,473,631 | 12/1995 | Moses | 704/211 |

(List continued on next page.)

OTHER PUBLICATIONS

Dave Bursky, "Single Chip Performs Both Audio and Video Decoding," Electronic Design, Apr. 3, 1995.

Unknown, "Coding of Moving Pictures and Associated Audio for Digital Storage Media At Up To About 1.5 MBIT/s," 3–11171 rev. 1, (Part 3 Audio), May 30, 1995.

International Organisation for Standardisation Organisation Internationale De Normalisation ISO/IEC JTC1/SC29/WG11 Coding of Moving Pictures and Audio, "*Information Technology—Generic Coding of Moving Pictures and Audio: Audio ISO/IEC 13818–3*", Second Addition, Feb. 20, 1997.

Martin Boliek, "*Real–Time Discrete Cosine Transform Chip Using Generalized Chen Transform Technology,*"pp. 428–431, Ricoh California Research Center, Menlo Park, CA.

Unknown, "*Digital Audio Compression* (AC–3)," T3 review copy of draft ATSC audio standard, Aug. 12, 1994, Doc. T3/251.

Unknown, "*Information Technology—Generic Coding of Moving Pictures and Associated Audio Information: Video,*" ISO/IEC 13818–2, Draft International Standard, Nov. 9, 1994.

*Primary Examiner*—David R. Hudspeth
*Assistant Examiner*—Susan Wieland
*Attorney, Agent, or Firm*—Beyer & Weaver, LLP

[57] ABSTRACT

A ROM for storing constants used in both the MPEG-2 and AC-3 audio decoding algorithms. These constants include (i) matrixing constants for AC-3 and MPEG audio decoding algorithms and (ii) windowing coefficients for AC-3 and MPEG audio decoding algorithms. The ROM includes (a) a first partition for storing a first set of constants which are windowing coefficients for AC-3 decoding, (b) a second partition for storing a second set of constants which are constants used for pre-IFFT and post-IFFT steps of AC-3 decoding (Blkswflag=1), (c) a third partition for storing a third set of constants which are both IDCT coefficients for MPEG decoding and IFFT coefficients for AC-3 decoding, (d) a fourth partition for storing a fourth set of constants which are constants used for pre-IFFT and post-IFFT steps of AC-3 decoding (Blkswflag=0), and (e) a fifth partition for storing a fifth set of constants which are windowing coefficients for MPEG decoding. The first and fifth partitions store 256 windowing coefficients for AC-3 decoding and 256 windowing coefficients for MPEG decoding, respectively. The second partition stores 64 sine and 64 cosine coefficients for AC-3 pre- and post-IFFT steps (Blkswflag=1). The fourth partition stores 128 sine and 128 cosine coefficients for AC-3 pre- and post-IFFT steps (Blkswflag=1). And, the third partition stores 64 unique sine constants and 64 unique cosine coefficients.

32 Claims, 11 Drawing Sheets

U.S. PATENT DOCUMENTS

| | | | |
|---|---|---|---|
| 5,515,107 | 5/1996 | Chiang et al. | 348/473 |
| 5,576,765 | 11/1996 | Cheney et al. | 348/407 |
| 5,576,958 | 11/1996 | Kawakatsu et al. | 364/725 |
| 5,594,789 | 1/1997 | Seaholtz et al. | 379/207 |
| 5,623,311 | 4/1997 | Phillips et al. | 348/396 |
| 5,635,985 | 6/1997 | Boyce et al. | 348/402 |
| 5,638,128 | 6/1997 | Hoogenboom et al. | 348/416 |

AUDIO DECODER CORE CONSTANTS ROM OPTIMIZATION

CROSS REFERENCE TO RELATED APPLICATIONS

This application is a continuation in part of U.S. patent application Ser. No. 08/642,520 filed on May 3, 1996 and naming Srinivasa R. Malladi and Mahadev S. Kolluru as inventors. That application is incorporated herein by reference for all purposes.

BACKGROUND OF THE INVENTION

The present invention relates to digital audio decoding. More specifically, the invention relates to hardware cores for decoding audio data encoded according to the MPEG-1 standard, MPEG-2 standard or AC-3 standard.

Various standards have been developed for the purpose of providing digitally encoded audio data that can be reconstructed to provide good quality audio playback. In the late 1980s, a digital audio/video reconstruction standard known as "MPEG" (for Motion Pictures Experts Group) was promulgated by the International Standards Organization (ISO). MPEG syntax provides an efficient way to represent audio and video sequences in the form of compact coded data. MPEG unambiguously defines the form of a compressed bit stream generated for digital audio/video data. Given the knowledge of the MPEG rules, one can thus create a decoder which reconstructs an audio/video sequence from the compressed bit stream.

MPEG-2 was initiated in the early 1990s to define a syntax for higher quality audio playback for broadcast video. The MPEG-1 audio standard is described in a document entitled "Coding of Moving Pictures and Associated Audio for Digital Storage Media at up to about 1.5 MBit/s" (Part 3 Audio) 3-11171 rev 1 (1995) (hereinafter "the MPEG-1 Document"). The MPEG-2 audio standard is described in a document entitled "Generic Coding of Moving Pictures and Associated Audio Information" ISO/IEC 13818-3 (1994) (hereinafter "the MPEG-2 Document"). Both standards documents are incorporated herein by reference for all purposes. Both documents are available from ISO/IEC Case Postale 56, CH-1211, Geneva 20, Switzerland.

A competing standard employing Dolby Æ processing and known as "AC-3" has also been developed by the United States Advanced Television Systems Committee for digital encoding and decoding of audio data. This standard is described in the "Digital Audio Compression (AC-3)" draft ATSC STANDARD" AC3STD68.DOC (1994) (hereinafter "the AC-3 Document") which is available from Dolby Laboratories, Inc. located in San Francisco, Calif. and is incorporated herein by reference for all purposes.

The MPEG-2 audio decoding algorithm requires certain steps such as decoding of bit allocation, decoding of scale factors, variable length decoding of audio samples, requantization of samples, inverse discrete cosine transform matrixing, and windowing. The AC-3 audio decoding algorithm requires certain steps such as bit allocation, dequantization, decoupling, rematrixing, dynamic range compression, inverse fast fourier transform, and windowing and de-interleaving.

While CPU digital processing power has improved markedly in recent years, the sheer volume of encoded audio/video data that must be rapidly decompressed and played back generally requires some dedicated system hardware, beyond the CPU, for MPEG-2 decoding. CPUs like SPARC from Sun Microsystems, Inc. of Mountain View, Calif., MIPS from Silicon Graphics, Inc. of Mountain View, Calif., Pentium from Intel Corporation of Santa Clara, Calif., etc. cannot, in themselves, handle multi-channel MPEG-2 audio decoding simultaneously with video decoding, at a low system clock. Thus, software/firmware implementation of the MPEG-2 decoding algorithms is not yet practical for mass market consumer applications, and dedicated hardware must be employed to perform at least some MPEG-2 decoding functions.

While the ISO/MPEG-2 and AC-3 standards do specify the form that encoded audio data must take, they do not specify either the exact sequence of steps or the hardware that must be employed in decoding the data. Thus, designers of MPEG-2 and AC-3 decoding systems are free to provide their own designs for particular applications. In fact, it is expected that each time an MPEG-2 or AC-3 decoder is to be designed for a new application, a designer will generate a new integrated circuit layout for the decoder.

Various MPEG-2 decoder chips are now available including the HDM8211M (from Hyundai Corporation of Seoul Korea) full MPEG-2 decoder of audio, video, and system (transport) bitstreams. See Bursky, "Single Chip Performs Both Audio and Video Decoding" Electronic Design, Apr. 3, 1995, pp. 77–80. Similarly, various AC-3 decoder chips are now available including the ZR38500 six channel Dolby digital surround processor (from Zoran Corporation of Santa Clara, Calif.).

Additionally, representative chips for decoding both MPEG and AC-3 encoded data include the ZR38521 two channel Dolby AC-3 and two channel MPEG-1 decoder and ZR38600 programmable Dolby AC-3 and MPEG-2 audio processor, all available from Zoran Corporation of Santa Clara, Calif. Other such representative chips include a Six Channel Decoder IC available from SGS Thompson of Grenoble, France and Thompson Multimedia of Hannover, Germany and a Common Transform Engine for MPEG/AC-3 audio decoding available from Motorola Semiconductor of Phoenix, Ariz.

None of these products shares resources for decoding both AC-3 and MPEG-1/MPEG-2 encoded data. Typically they employ a digital signal processing (DSP) core, which is normally loaded onto an on-chip ROM and has microprogrammed thereon logic instructions for AC-3 decoding that are totally separate from the logic instructions for MPEG decoding. Thus, it would be desirable to have a system optimized for decoding both of these formats.

SUMMARY OF THE INVENTION

Hereinafter, except where distinctions between the two versions of the MPEG standard exist, the terms "MPEG-1" and "MPEG-2" will be used interchangeably to reference those audio decoding algorithms promulgated in the original MPEG-1 Document as well as in the MPEG-2 Document, and any future versions of MPEG decoding. Likewise, the term "AC-3" is intended to refer to not only the current AC-3 standard, but any other versions of this standard that exist now or are developed in the future.

The present invention provides a ROM for storing constants used in both the MPEG-2 and AC-3 audio decoding algorithms. These constants may include (i) matrixing constants for AC-3 and MPEG audio decoding algorithms and (ii) windowing coefficients for AC-3 and MPEG audio decoding algorithms. Preferably, the ROM includes (a) a first partition for storing a first set of constants which are windowing coefficients for AC-3 decoding, (b) a second partition for storing a second set of constants which are constants used for pre-IFFT and post-IFFT steps of AC-3 decoding (Blkswflag=1), (c) a third partition for storing a third set of constants which are both IDCT coefficients for MPEG decoding and IFFT coefficients for AC-3 decoding, (d) a fourth partition for storing a fourth set of constants which are constants used for pre-IFFT and post-IFFT steps of AC-3 decoding (Blkswflag=0), and (e) a fifth partition for storing a fifth set of constants which are windowing coefficients for MPEG decoding. Preferably, the first and fifth partitions store 256 windowing coefficients for AC-3 decoding and 256 windowing coefficients for MPEG decoding, respectively. Preferably, the second partition stores 64 sine and 64 cosine coefficients for AC-3 pre- and post-IFFT steps (Blkswflag=1). Preferably, the fourth partition stores 128 sine and 128 cosine coefficients for AC-3 pre- and post-IFFT steps (Blkswflag=1). And most preferably, the third partition stores a reduced set of 64 unique sine constants and 64 unique cosine coefficients (as opposed to 2048 constants specified for IDCT and 16,384 constants specified for IFFT), thereby greatly reducing the amount of storage space required in the ROM.

Preferably, the ROMs of this invention are employed in a reusable hardware layout ("core") for performing some, but not all, MPEG and AC-3 audio decoding functions. The functional blocks comprising this "audio core" define a unique hardware architecture which can be used with additional hardware or software for performing those MPEG and AC-3 audio decoding functions not performed by the audio core.

The audio core design itself is preferably stored on a machine readable media such as a magnetic or optical storage unit. The information content of the core preferably includes a series of hardware layouts specifying the locations and features of various circuit elements comprising the audio core architecture. Ultimately, the audio core design is implemented as hardware on one or more chips. Thus, the audio core design exists as both an intangible description of hardware and as the actual hardware itself.

In a preferred embodiment, the audio decoder core design specifies that at least the following MPEG and AC-3 functions are performed by the hardware: sub-band synthesis (or "matrixing") and windowing. These functions are detailed in the MPEG Document and the AC-3 Document (as "Transformation Equations"). In especially preferred embodiments, other MPEG-2 and AC-3 functions such as bit allocation decoding, scale factor decoding, variable length decoding, requantization, decoupling, rematrixing, and dynamic range compression are performed outside the audio core of this invention by a CPU executing software or firmware instructions.

In one aspect, the present invention provides an audio core design having a data path for performing some functions (usually matrixing and windowing) of both MPEG audio decoding and AC-3 audio decoding. From a structural perspective, the data path should include at least one multiplier and at least one accumulator. Other architecturally distinct logical blocks of the audio core may be a control logic unit, an input RAM interface (for controlling an input RAM), an output RAM interface (for controlling an output RAM), a ROM, a ROM addressing logic unit, and a registers interface. The input RAM and the output RAM are preferably located outside of the audio core.

DETAILED DESCRIPTION OF THE PREFERRED EMBODIMENTS

A. Application of Invention to Cores

Figure 1A:
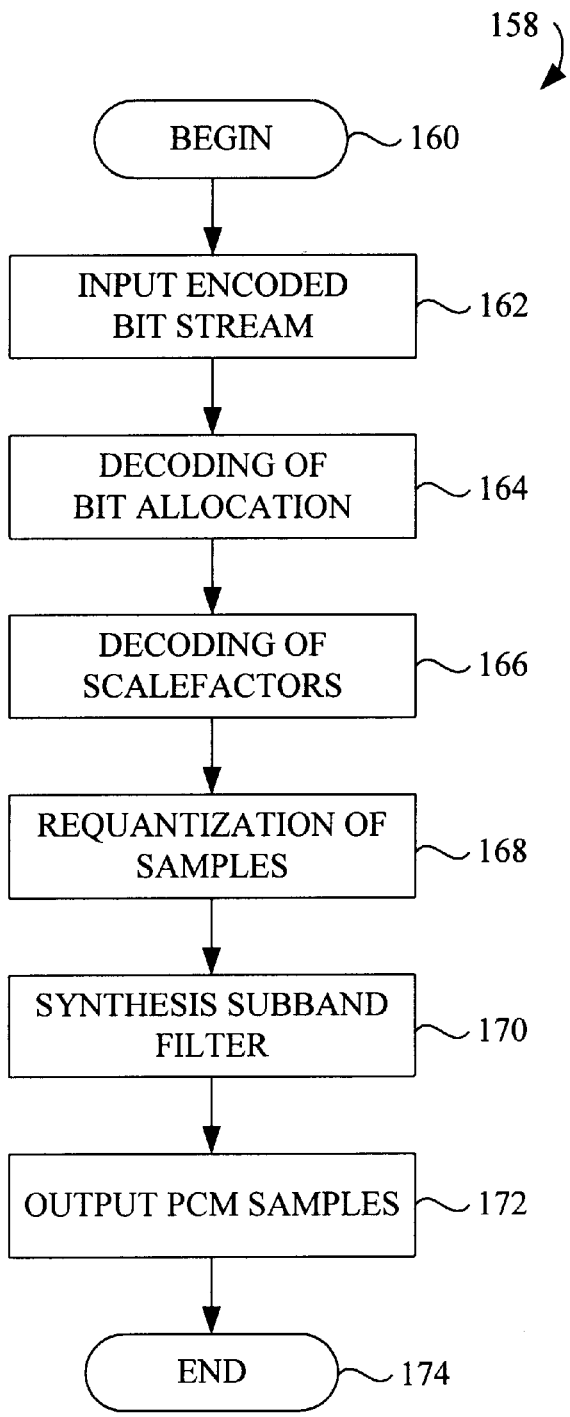
FIG. 1A is a process flow diagram illustrating the major steps required to decode MPEG audio data.

The present invention pertains to integrated circuit cores which implement at least some of the MPEG and/or AC-3 decoding requirements. As used herein, a "core" is the hardware layout of a substantially self-contained integrated circuit module such as a CPU, an Asynchronous Transfer Mode (ATM) unit, a memory unit, a network interface, a video decoder, and, the subject of this invention, an audio decoder. The physical core has associated therewith a core design which specifies a transistor-level layout including a collection of mask layouts used to generate the reticles for photolithography steps employed during integrated circuit fabrication. The core design also includes certain processing parameters associated with masks, such as ion implant energy and dose, etch conditions, oxidation conditions, chemical vapor deposition conditions, etc. Still further, the core design includes information specifying the core interface parameters such as the types of input and output signals required, the locations of the various interface connections, etc.

Some enterprises maintain libraries of cores, with each core of each library including the design information provided above. Such libraries provide competitive advantages to enterprises that make custom integrated circuits such as multi-core systems on a single semiconductor chip. Often such custom chips are not expected to sell in huge volume (at least as compared to CPU microprocessors for personal computers, for example). Thus, their design costs must be kept to a minimum. This can be accomplished by working with an enterprise that has an appropriate core design available for integration into the customer's chip design because the core need not be designed from scratch; the customer simply sets aside a "black box" of appropriate size and interface reserved for the core within its larger integrated circuit design.

As noted, core design libraries facilitate design of complex multi-functional "systems on a chip" including multiple cores integrated on single semiconductor chip. For instance, a single system on a chip might include a microprocessor core, a video decoder core, and an audio decoder core: all taken from the library of core designs. A system designer is left with the task of integrating the various cores on a single chip and providing any processing functionality not specified in the core designs.

The audio decoder core designs of the present invention possess the benefits of core designs generally as described above. Preferably, though not necessarily, the audio decoder core designs of this invention are provided as part of a larger library of core designs as described above.

While the present invention relates primarily to audio core designs and hardware, it also relates to methods of using the core designs in computer aided design of chip systems. Further, the invention relates to an apparatus for performing these operations. This apparatus may be specially constructed for the required purposes, or it may be a general purpose programmable machine selectively activated or reconfigured by a computer program stored in memory. The designs and methods presented herein are not inherently related to any particular computer or other apparatus. In particular, various general purpose machines may be used with programs written in accordance with the teachings herein, or it may be more convenient to construct a more specialized apparatus to perform the required method steps.

Still further, the present invention relates to machine readable media on which are stored (i) the audio core layout parameters and/or (ii) program instructions for using audio core in performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

B. MPEG-2 and AC-3 Decoding Process

As the present invention preferably implements portions of the MPEG-2 and AC-3 audio decoding algorithms, these general decoding algorithms will now be briefly described with reference to FIGS. 1A and 1B. For purposes of the following discussion, it will be assumed that the reader has available a copy of the above identified MPEG and AC-3 Documents which were previously incorporated herein by reference.

The MPEG decoding process is detailed in FIG. 1A. As shown there, a process 158 begins at 160 and then, in a step 162, the MPEG encoded bit stream is input to the audio decoder. Thereafter, at a step 164, the system decodes bit allocation parameters which specify the sample and scale-factor size for the data in each channel. Next, at a step 166, the system decodes "scalefactors" for use in a requantization step. Requantization of the actual encoded audio samples is performed next at a step 168.

MPEG audio data is provided as collections of discrete samples which are decoded in groups of 32. Further, the encoded MPEG audio data may include samples for 1, 2, 3, 4, 5, or 6 distinct channels. If only a single channel is provided, the audio data is replayed in monaural format. If two channels of encoded data are provided, the audio information is replayed in a stereo format. The other channels provide additional audio formats, with the sixth channel providing low frequency enhancement (i.e., the sixth channel provides sub-woofer data). Note that each channel being decoded will be coded in groups of 32 samples. Thus, if the audio format is monaural, only 32 samples will be decoded per MPEG decoding cycle. However, if a stereo format is employed, the decoder will decode 64 samples per decoding cycle.

The examples and discussion presented hereinafter will be directed to the MPEG-1 standard and MPEG-2 Layer I standard in which 32 samples per channel are decoded. However, it should be understood that the invention applies equally to the MPEG-2 Layer II standard in which 32*3=96 samples per channel are decoded.

Returning again to FIG. 1A, the process steps conducted through step 168 are performed outside of the audio core of this invention. Beginning with a step 170, processing is performed within the audio core. At step 170, subband synthesis of the samples is performed. Thereafter, at a step 172, the resulting Pulse Code Modulation (PCM) samples are output from the audio core. Thereafter the process is concluded at step 174.

The process flow 158 is reproduced from 3-A.1 (Annex) A of the MPEG document. It should be noted that MPEG audio decoding can be performed according to two formats in accordance with this invention: layer I and layer II. The above described procedure was made with respect to layer I. Layer II decoding is much like layer I decoding, except that the number of samples being processed in each audio decoding cycle is 96 rather than merely 32. Layers I and II are described generally at pages 39 through 42 of the MPEG document.

Figure 1B:
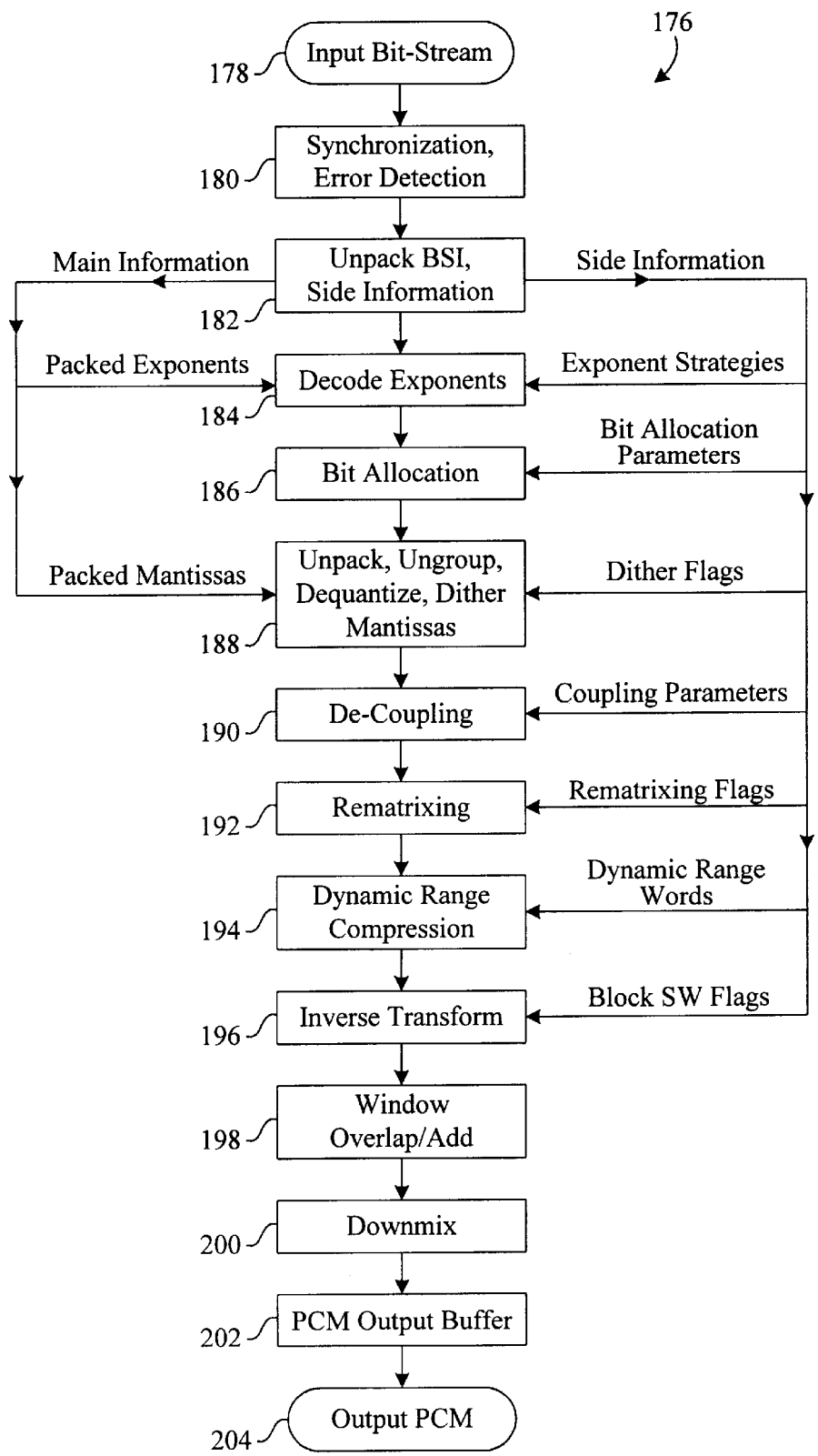
FIG. 1B is a process flow diagram illustrating the major steps required to decode AC-3 audio data.

Turning now to the process for AC-3 decoding, an AC-3 decoding process 176 is shown in FIG. 1B. This figure is reproduced from FIG. 6-1 (page 36) of the AC-3 document. The decoding process 176 begins at step 178 where the input bit stream is provided to the audio decoder. Next, at a step 180, the bit stream is synchronized and checked for errors. Thereafter, BSI and side information are unpacked at step 182. This information is employed in most of the remaining AC-3 decoding steps. Next, at step 184, the exponents for current group of samples are decoded. It should be noted that the sample data provided in the AC-3 format is in floating point format, as opposed to integer format (in the case of MPEG encoded data). Note also that the exponent strategies information (from the side information) and the actual packed exponents (from the BSI) are employed to decode the exponents at step 184.

Next, bit allocation parameters from the side information are used to allocate the bits within the bit stream at step 186. Thereafter, at a step 188, the mantissas are unpacked, ungrouped, dequantized, and dithered. Note that the actual packed manitssas are provided from BSI main information, and dither flags are provided from the side information. Following in from step 188 are a decoupling step 190, a rematrixing step 192, and a dynamic range compression step 194. Each of these steps employs the appropriate parameters or flags from the side information unpacked at step 182.

To this point, all steps in the AC-3 decoding process have been performed outside of the audio core. Beginning with a step 196, the processing is conducted within the audio core of this invention. Step 196, involves performing an inverse fast fourier transform of 256 AC-3 encoded samples. As will be explained in more detail below, this inverse fast fourier transform can be conducted in one of two modes: a 512-sample transform, and a 256-sample transform. A block SW flag (referred to as "Blkswflag") from the side information unpacked in step 182 specifies which of these two formats is to be employed on the incoming data. If the block SW flag is equal to 1, then the 256-sample transform is employed and if block SW flag is equal to 0, then the 512-sample transform is employed. After the inverse transform step 196 has been completed, the process proceeds to a step 198 where windowing and overlap/add processing is performed. These steps will be described in more detail below. The next step is a downmix step 200. Thereafter, the actual PCM values are provided to an output buffer at a step 202.

At this point, the AC-3 processing within the audio core is complete, and further processing is again performed outside of the audio core. Finally, the PCM values are output at a step 204.

The inverse fast fourier transform, windowing, and overlap/add steps of the AC-3 process are described at pages 73 through 77 of the AC-3 standard documents.

C. Audio Core Architecture

Some approaches to implementing MPEG and AC-3 audio decoding have relied upon a general purpose CPU and software/firmware for performing all specified decoding steps. Unfortunately, this is not the most efficient way to handle the computationally intensive steps of the MPEG and AC-3 decoding algorithms. Further, to the extent that the CPU must be employed to perform the decoding steps, it is unavailable to perform other processing required by the system. Alternate previous approaches have relied entirely on custom hardware having a microcontroller which microsequences the control functions.

In contrast, the present invention segregates some computationally intensive MPEG and AC-3 decoding functions in dedicated hardware (the audio core), while allowing other less computationally intensive functions to be performed outside the core by a general purpose CPU for example. Thus, an IC designer is at liberty to develop specific processing capabilities for those MPEG and AC-3 decoder functions not in the audio core. Individual customers can employ the audio core of this invention and focus their design efforts on decoder functions such as run length decoding, and thereby develop a market niche on the basis of such specialization. In this invention, the audio core preferably performs the matrixing (inverse discrete cosine transform for MPEG and inverse fast fourier transform for AC-3), downmixing for AC-3 and windowing/overlap/add steps.

Figure 2:
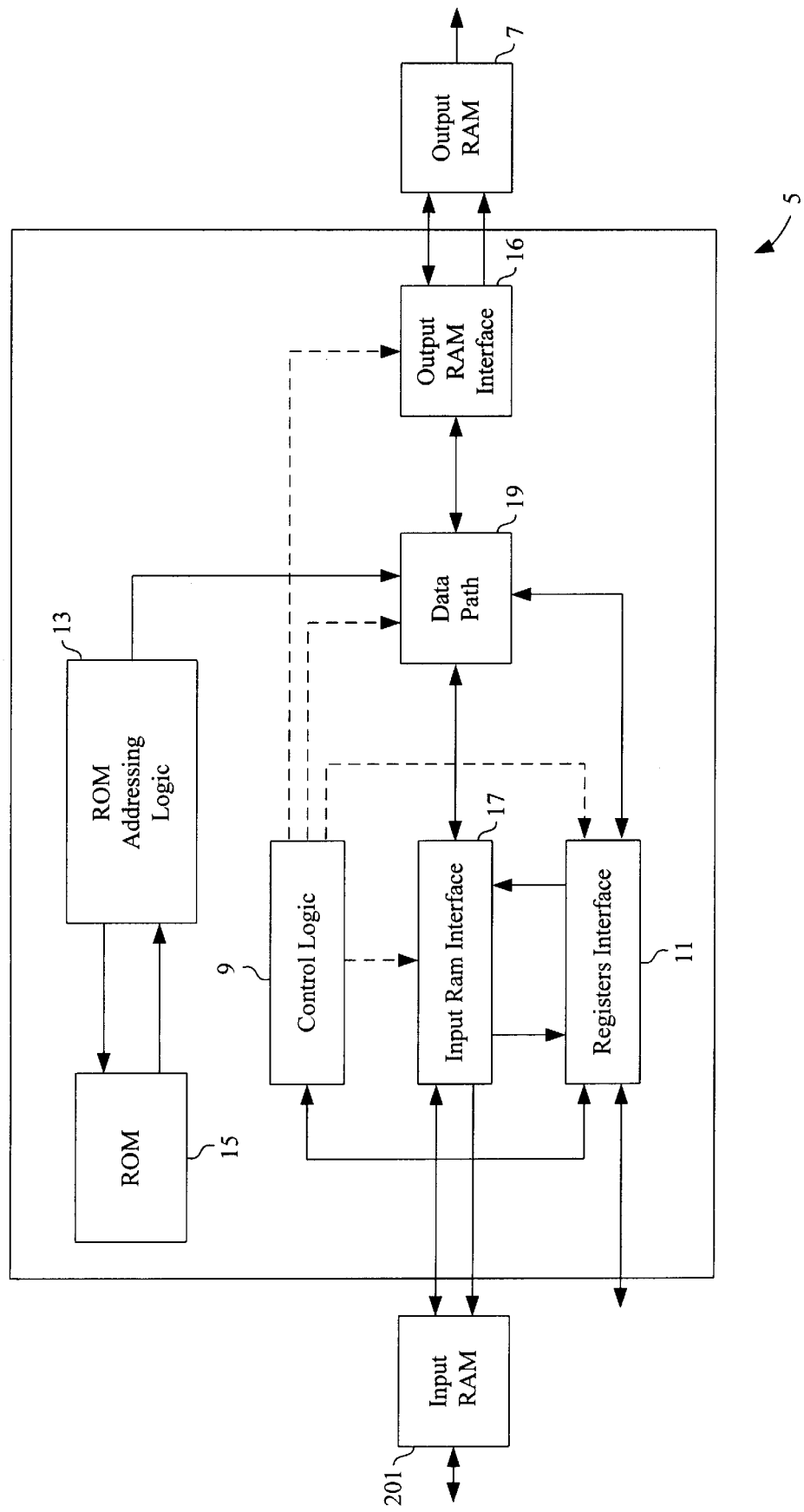
FIG. 2 is a block diagram illustrating the major hardware blocks of an audio core designed in accordance with this invention.

FIG. 2 is a block diagram of an audio core 5 constructed in accordance with a preferred embodiment of the present invention. In this figure, dashed lines indicate control signals, thin continuous lines indicate address signals, and thick continuous lines indicate data signals. While not forming part of the audio core per se, an input RAM 201 and an output RAM 7 are components of the overall audio decoding system which directly communicate with the logical blocks of audio core 5.

The control logic for the audio core 5 resides in a control logic block 9 which includes two state machines (not shown): one of which controls MPEG 2 processing and the other of which controls AC-3 processing. Control logic block 9 retrieves values from a register interface 11 which, in turn, receives data values from the encoded audio bit stream provided to portions of the audio decoder upstream from the audio core. Based upon the current values in the registers interface 11, the control logic block 9 provides control signals to a ROM addressing logic unit 13, an output RAM interface 16, an input RAM 17, and a data path 19. Among the signals provided by control logic block 9 are a "current state" indicative of the state of the overall MPEG 2 or AC-3 process, a "secstate" (hereinafter referred to as "secondary state") indicating the operation being performed within the "curstate," and a "loopcnt" (hereinafter referred to as "loop count") specifying the number of iterations performed since the system entered its current state.

Sub-band samples that have already been inverse quantized and otherwise processed prior to matrixing are loaded into input RAM 201. When a sufficient number of these samples have been loaded, a signal is provided to the register interface 11 indicating that the audio core may now retrieve the samples stored in input RAM 201. At that point, the samples are provided one-by-one to input RAM interface 17. More specifically, input RAM interface 17 provides address signals to input RAM 201. The samples associated with those address values are then forwarded, in the order specified by the address signals, as data to the input RAM interface 17. From input RAM interface 17, the samples are provided, in the order received, to data path 19. There they are multiplied with appropriate values from a ROM 15 and accumulated as necessary. Note that ROM addressing logic unit 13 generates the addresses for retrieving appropriate stored data values from ROM 15.

Data path 19 performs the computational operations required for sub-band synthesis (matrixing) and windowing in accordance with the MPEG 2 and AC-3 standards. During these processes, intermediate values generated in data path 19 are temporarily written back to input RAM 201. As part of this process, input RAM interface 17 generates appropriate addresses for writing the intermediate values to input RAM 201. In subsequent processing, the intermediate values are retrieved from input RAM 201 by input RAM interface 17 and provided to data path 19 for further processing. After such further processing, the resulting values are forwarded to output RAM 7 where they are stored at addresses generated by output RAM interface 16.

In the hardware of the audio core, nearly all of the architecture is shared in MPEG and AC-3 decoding. The only major exceptions are the MPEG state machine and the AC-3 state machine.

D. Partitioning of the Input RAM

Figures 10A, 10B:
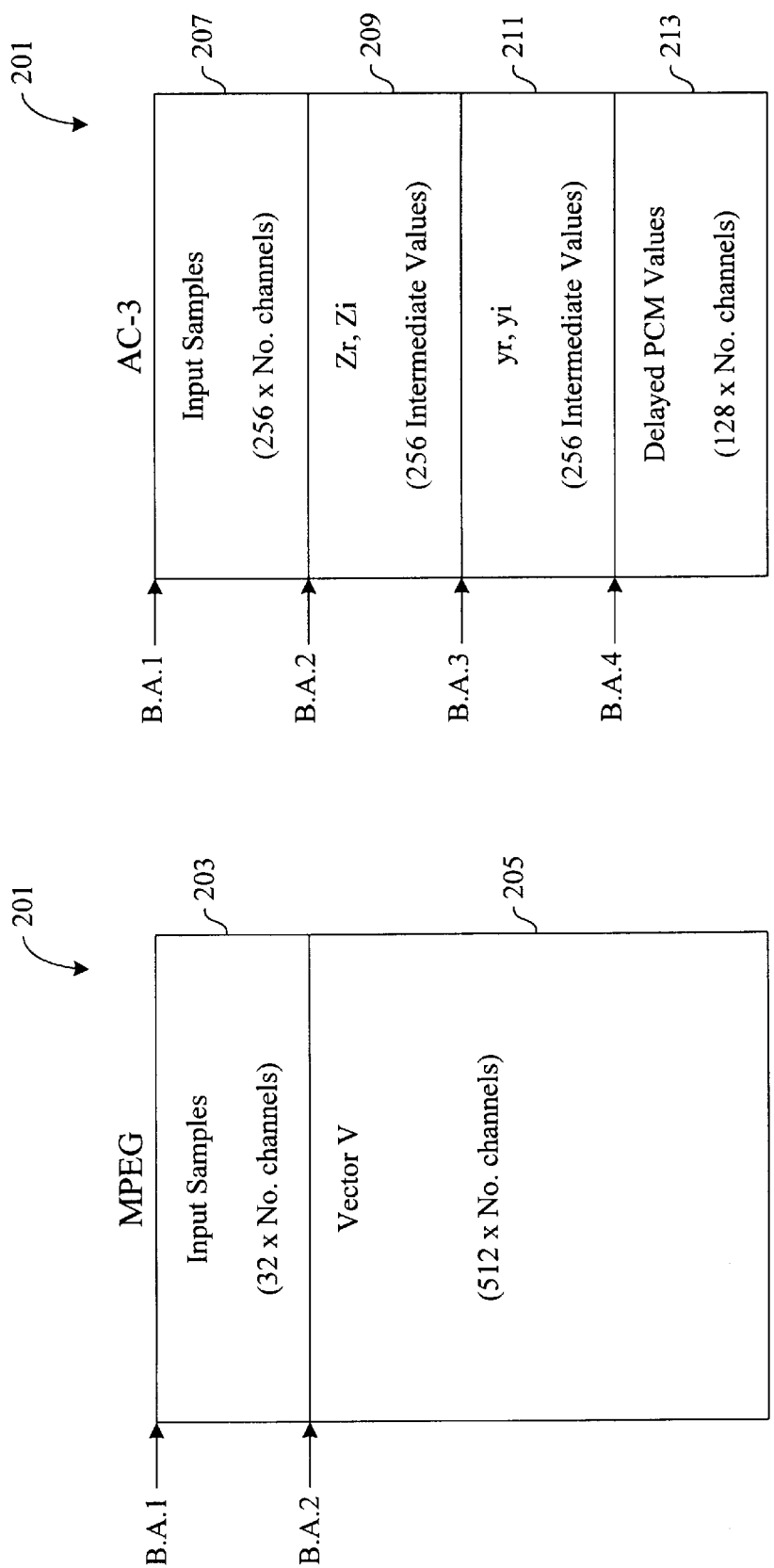
FIG. 10A is a block diagram illustrating the major audio core input RAM partitions employed for MPEG decoding.
FIG. 10B is a block diagram illustrating the major audio core input RAM partitions employed for AC-3 decoding.

FIGS. 10A and 10B show the partitioning of the input RAM contents. As shown, input RAM 201 will have different partitions depending upon whether the encoded data is MPEG data or AC-3 data. As shown in FIG. 10A, the MPEG partitioning provides two sections: a first section 203 in which input sub-band samples are stored prior to processing by the audio core and a "vector V" section 205 where intermediate values for a vector V calculated by the audio core itself are stored. The AC-3 partitioning shown in FIG. 10B includes four sections: an input sample section 207 which stores the incoming sub-band encoded data samples before they are presented to the audio core, a Zr, Zi section 209, a yr, yi, section 211, and a delayed PCM values section 213. Each of the sections 209, 211, and 213 store intermediate values calculated by the audio core during processing of input samples originally stored in section 207.

As shown in FIG. 10A, input sample section 203 is large enough to store the data contained in 32 samples times the number of non-PCM audio channels (a maximum of five), for a maximum of 160 samples. Preferably, there are 24 bits per sample. Also shown in FIG. 10A, the vector V section 205 is sufficiently large to store 512 intermediate values (from vector V) per channel, for a maximum of 2560 intermediate values of 24 bits each. When the input RAM 201 is partitioned for AC-3 processing, as shown in FIG. 10B, the input samples are stored in partition 207 which is sized to store 256 times the number of channels. The Zr, Zi and yr, yi intermediate values are each stored in their own sections sized to contain 256 intermediate values of 24 bits each (sections 209 and 211). Finally, the delayed PCM values are stored in section 213 which is sized to store 128 values per channel.

E. MPEG Matrixing and Windowing

Figure 3:
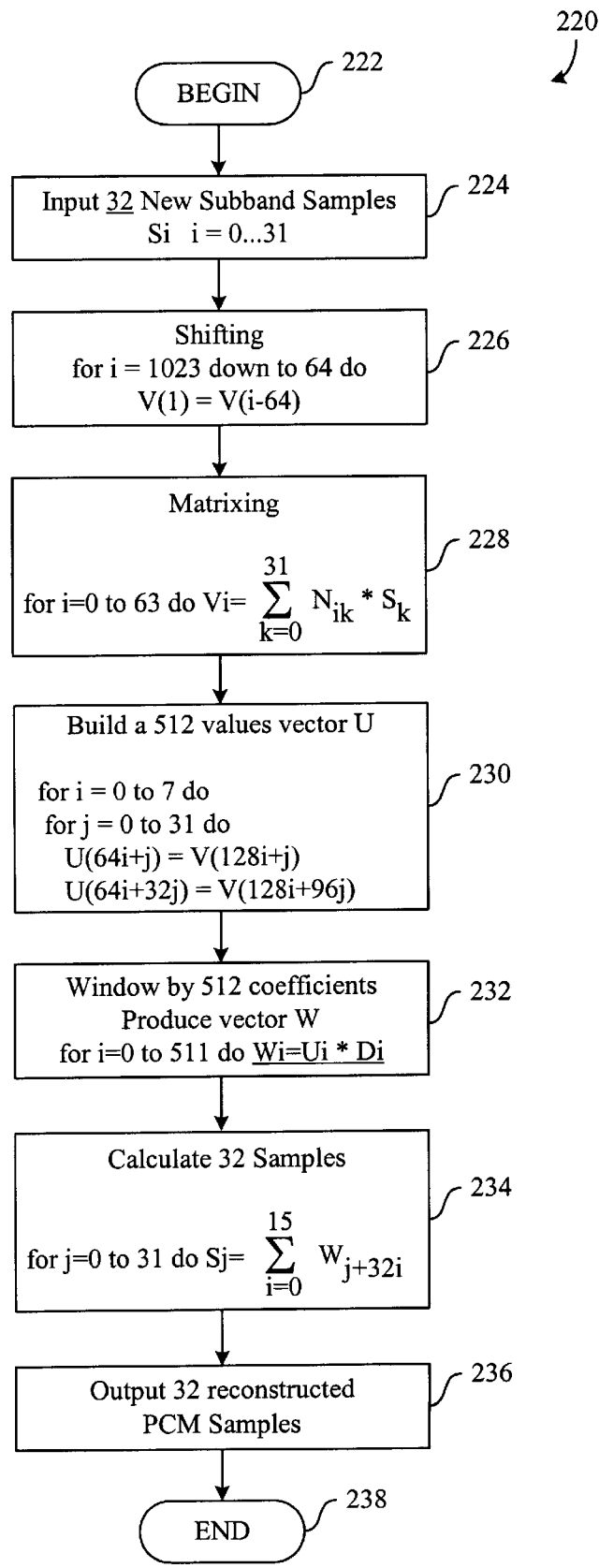
FIG. 3 is a process flow diagram of the principal MPEG Layer I and Layer II matrixing and windowing steps reproduced from the MPEG Document.

FIG. 3 is a flow chart reproduced from the MPEG Document. The process depicts the matrixing and windowing steps as required by the MPEG standard (corresponding to the step 170 of FIG. 1A). The process begins at 222 and proceeds to a step 224 where 32 new samples (per channel) are input. Thereafter, at step 226, the system implementing MPEG "shifts" the indices of elements constituting a vector V. Vector V is made up of 1024 previously stored values. As suggested by the MPEG standard, the shifting process involves freeing up 64 slots (V0–V64) by subtracting 64 from the indices of each of the 1024 existing values in vector V. In this manner, the vector values 960 through 1023 are shifted out of vector V.

Next, at a step 228, this system performs a matrixing operation (one dimensional inverse discrete cosine transform or IDCT) in which 64 new values are provided for vector V. These values are given indices $V_0$ through $V_{63}$ and are calculated according to the following expression:

$$V_i = \Sigma N_{ik} * S_k \text{ (for k=0 to 31)}$$

In this expression, the values of $S_k$ are the 32 samples which were input at step 224, and the values of $N_{ik}$ are constants given by the equation $N_{ik}=\cos[(16+i)(2k+1)/64]$.

Next, at a step 230, a vector U is created by reindexing the values of vector V according to the expressions shown in 230 of FIG. 3.

for i=0 to 7 do
for j=0 to 31

$$U(64i+j) = V(128i+j)$$

$$U(64i+32j) = V(128i+96j)$$

Note that vector U will have only half the number of values as vector V (i.e., 512 values verses 1024 values).

The above described set of steps (steps 224, 226, 228, and 230) describe the matrixing operation performed by the audio core. After matrixing has completed at step 230, the windowing process begins at a step 232. As indicated at step 232 in FIG. 3, a vector W is produced by multiplying each value of vector U by a distinct coefficient, $D_i$. The values for $D_i$ are provided in Table 3-B.3 (page B-6 though B-8) of Annex B of the MPEG Document. After the vector W has been created, 32 samples (j=0 to 31) are calculated at a step 234 according to the expression shown in FIG. 3.

$$S_j = \Sigma W_{j+32i} \text{ (for i=0 to 15)}$$

In this expression, the individual sample values are noted by "Sj". As shown, each sample is constructed by summing 16 different values from vector W. Thus, each of the 32 samples employs 16 unique values from vector W, so that each value comprising vector W is used only one time in the construction of the 32 samples. After the samples have been constructed in step 234, a step 236 outputs the reconstructed PCM samples which are ready for playback. The process is completed at 238.

The present invention combines certain of the above mathematical operations required by the MPEG standard and then generates storage addresses for the resulting values according to an indexing scheme that condenses the above-described process to the following steps: (1) an input sub-band sample step, (2) a matrixing step, (3) a windowing step, and (4) an output reconstructed PCM samples step. Thus, in the flow chart of FIG. 3, steps 226, 228, and 230 are combined into a single matrixing step. Similarly, steps 232 and 234 are combined into a single windowing step. In this manner, the sub-band synthesis and windowing step can be performed faster and with fewer resources than is suggested by the MPEG document.

In a preferred embodiment, the audio core begins processing after it is informed that 32 new sub-band samples per channel (for a maximum of 160 sub-band samples of 24 bits each) have been loaded into the input RAM 201. At that point, the audio core begins sub-band synthesis of the 32 values stored for the first channel. This entails producing 32 new values for vector V according to the expression shown in step 228 of FIG. 3. The audio core then writes the 32 new values to addresses in the vector V partition of input RAM 201 at locations which overwrite old vector V values $V_{480}$ through $V_{512}$. In this manner, shifting step 226 (FIG. 3) is effectively performed. Further, the addresses employed by the audio core for storage of the vector V values are accessed as necessary according to the indices specified for the vector U as indicated in step 230 of FIG. 3. Thus, the audio core performs steps 226, 228, and 230 by simply calculating the 32 new values for vector V and applying an appropriate address to each of the se values.

As noted, the audio core performs steps 232 and 234 of FIG. 3 in a single step. This is accomplished by performing the summation shown in step 234 while in the same step generating the values of vector W only as needed for the summation. For example, for j=0 and i=0, the value of vetor W is obtained by multiplying the value $U_0$ by the windowing coefficient $D_0$. In this manner, the step of initially calculating all 512 values of vector W is postponed to streamline the data retrieval process.

A few points regarding the process of FIG. 3 are worth noting. First, for each 32 samples (per channel) loaded into input RAM 201, 32 values of vector V are generated. However, a total of 512 values are stored in the entire vector V. With each step of generating 32 new values of vector V the oldest 32 values in the entire vector V are shifted out. Thus, at any given time, the 16 most recent collections of 32 input samples (per channel) provide values currently stored in vector V. Second, while there are a total of 1024 values in vector V, according to the MPEG documents, some symmetry in the values of coefficient $N_{ik}$ require storage of only 512 values as vector V in the audio core implementation. That is, half of the values in original vector V are not stored in vector V of the audio core implementation. This is because each unique value in vector V has a corresponding value also within vector V that is opposite in sign. Thus, the information content in the 1024 values of vector V, as per the MPEG standard, is maintained in the 512 values of vector V of the audio core implementation.

F. RAM and ROM Address Generation in the Audio Core

Preferably, new addresses are generated by input RAM interface 17 and ROM addressing logic 13 from two parameters: a base address and an offset. The proper base address and offset for each stage of the sub-band synthesis and windowing steps performed by the audio core may be uniquely specified as follows. The MPEG and AC-3 processes may be divided into a series of "states". For example, the MPEG process is divided into a matrixing state, a windowing state, and an output state. Within each state, a defined number of cycles is required to complete the operations required by that state. Further, the secondary state and loop count (mentioned above) within each state unambiguously specifies what operation is being performed. Therefore, the audio core state, secondary state and loop count within that state uniquely specify addresses associated with input RAM 201, output RAM 7, and ROM 15. Those addresses are provided as a combination of a base address and an offset as mentioned above.

It should be understood that it requires a few cycles to generate each address. Specifically, various offset values must be multiplexed to generate a single offset value used to calculate the current address. Similarly, multiple base addresses must be multiplexed to generate a single base address used to generate the current address. Further, the offset must be added to the base address. Thus, the current addresses provided by the input RAM interface 17, the output RAM interface 16, and the ROM interface 13 are not generated instantaneously. As a result, the audio core must be designed to begin the address generating process one clock cycle before the data from the addressed location is used in the computations.

G. Audio Core Microarchitecture—The ROM and the ROM Interface

Figure 4:
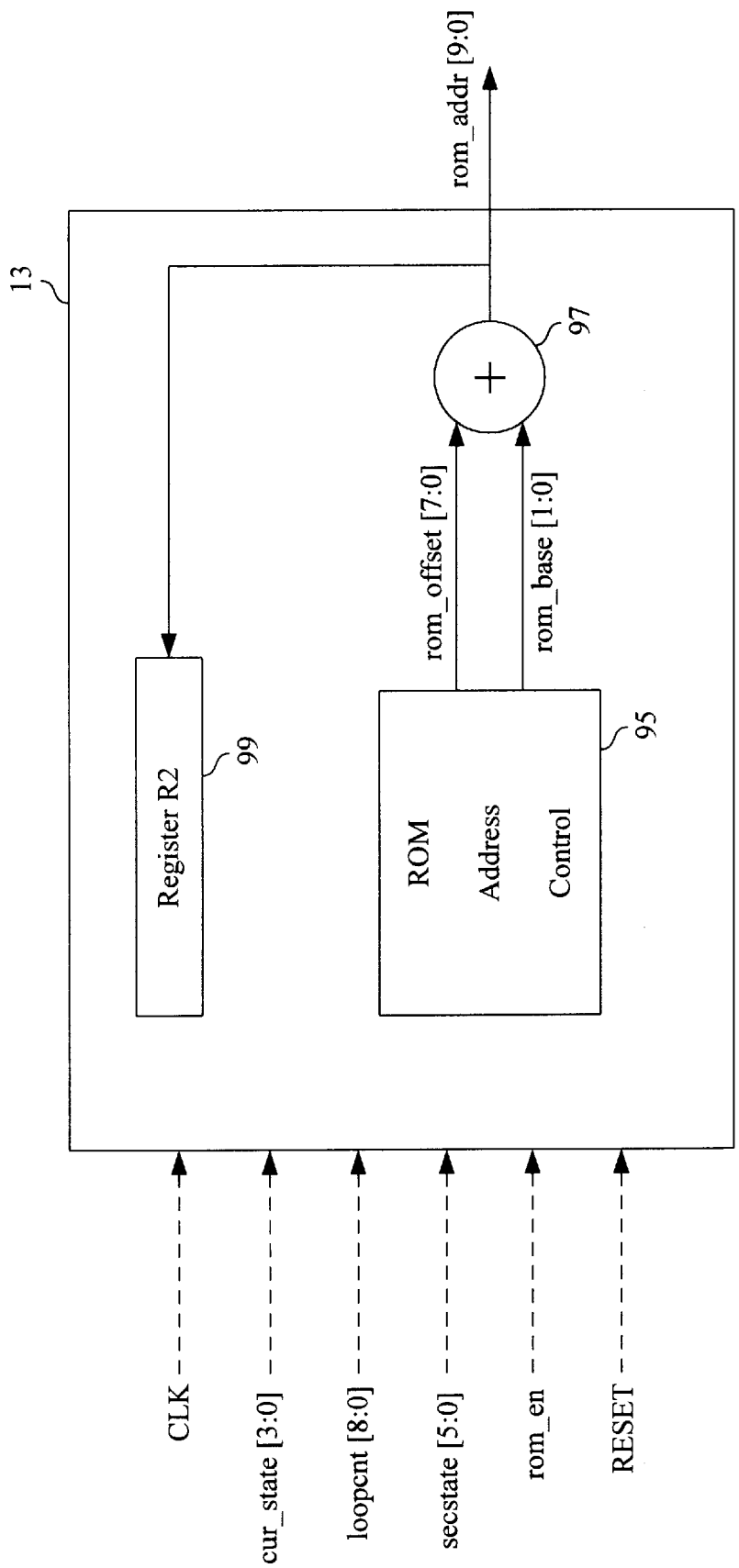
FIG. 4 is a block diagram of the ROM interfacing logic employed in an audio core of this invention.
Figure 5:
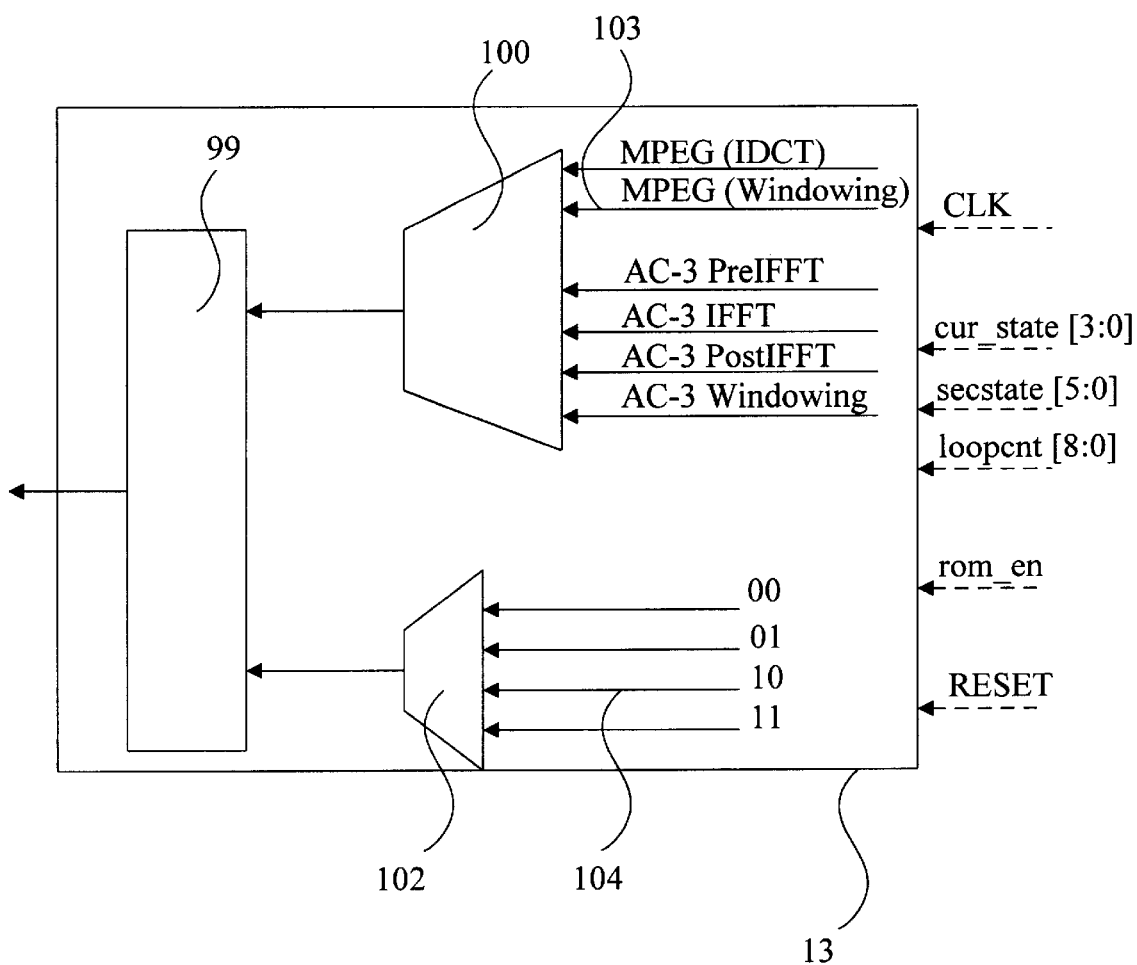
FIG. 5 is a block diagram of the ROM addressing logic employed in an audio core of this invention.

FIG. 4 details the architecture of one suitable design for ROM addressing logic block 13. As shown, addressing logic block 13 receives as input signals a clock and a reset signal from the system, together with current state, secondary state, loop count, and ROM enable signals from the control logic unit 9. In response to the input signals, addressing logic block 13 generates a ROM base address and a ROM offset, as described hereinafter. Addressing logic block 13 includes a set of lines 103 connected to a ROM offset multiplexer 100 for generating the offset. Lines 103 include one wire for each of six states, i.e. there are separate wires for MPEG IDCT, MPEG Windowing, AC-3 PreIFFT, AC-3 IFFT, AC-3 PostIFFT and AC-3 Windowing. Similarly, in order to generate a base address, addressing logic block 13 includes a set of lines 104 connected to a ROM base address multiplexer 102. Lines 104 include one input line for each of four ROM partitions (discussed below) containing 256 coefficient values, e.g. one wire labeled "00" for the first set of 256 values, a second wire labeled "01" for the second set of 256 values, a third wire labeled "10" for the third set of 256 values and a fourth wire labeled "11" for the fourth set of 256 values. Depending on the current state of the audio decoder and the input signals, appropriate ones of lines 103 and 104 are active. Using the active signals, multiplexers 100 and 102 provide a ROM addressing register 99 with a 10 bit ROM address. Multiplexer 100 provides an 8 bit offset and multiplexer 104 provides a 2 bit base address to the ROM addressing register 99, wherefrom the ROM address is provided to ROM 15 and may be read by various audio decoding elements. Further, the ROM enable control signal is provided to ROM 15.

Figure 7:
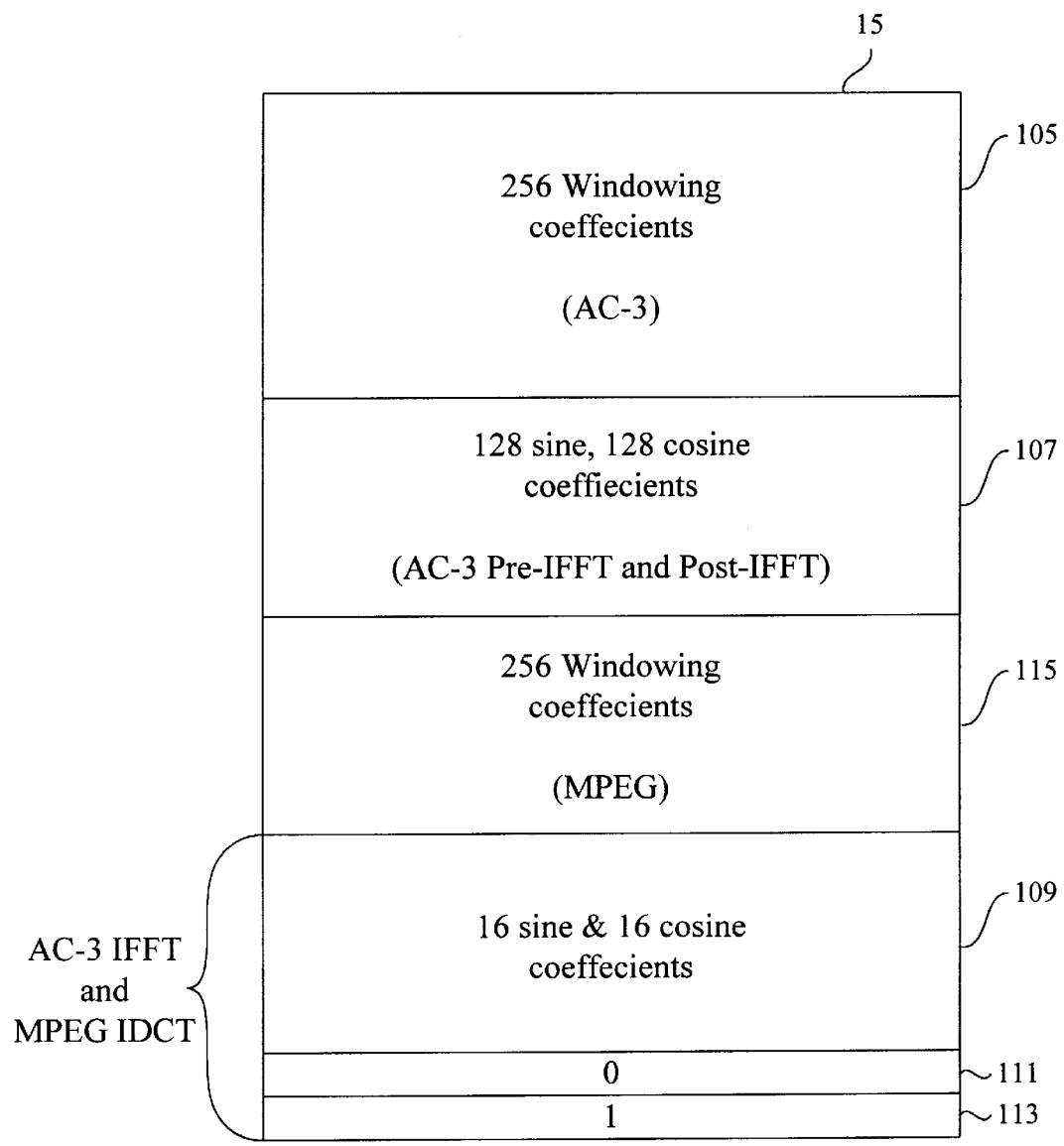
FIG. 7 is a block diagram of the ROM partitioning in accordance with a preferred embodiment of the present invention.
Figure 8:
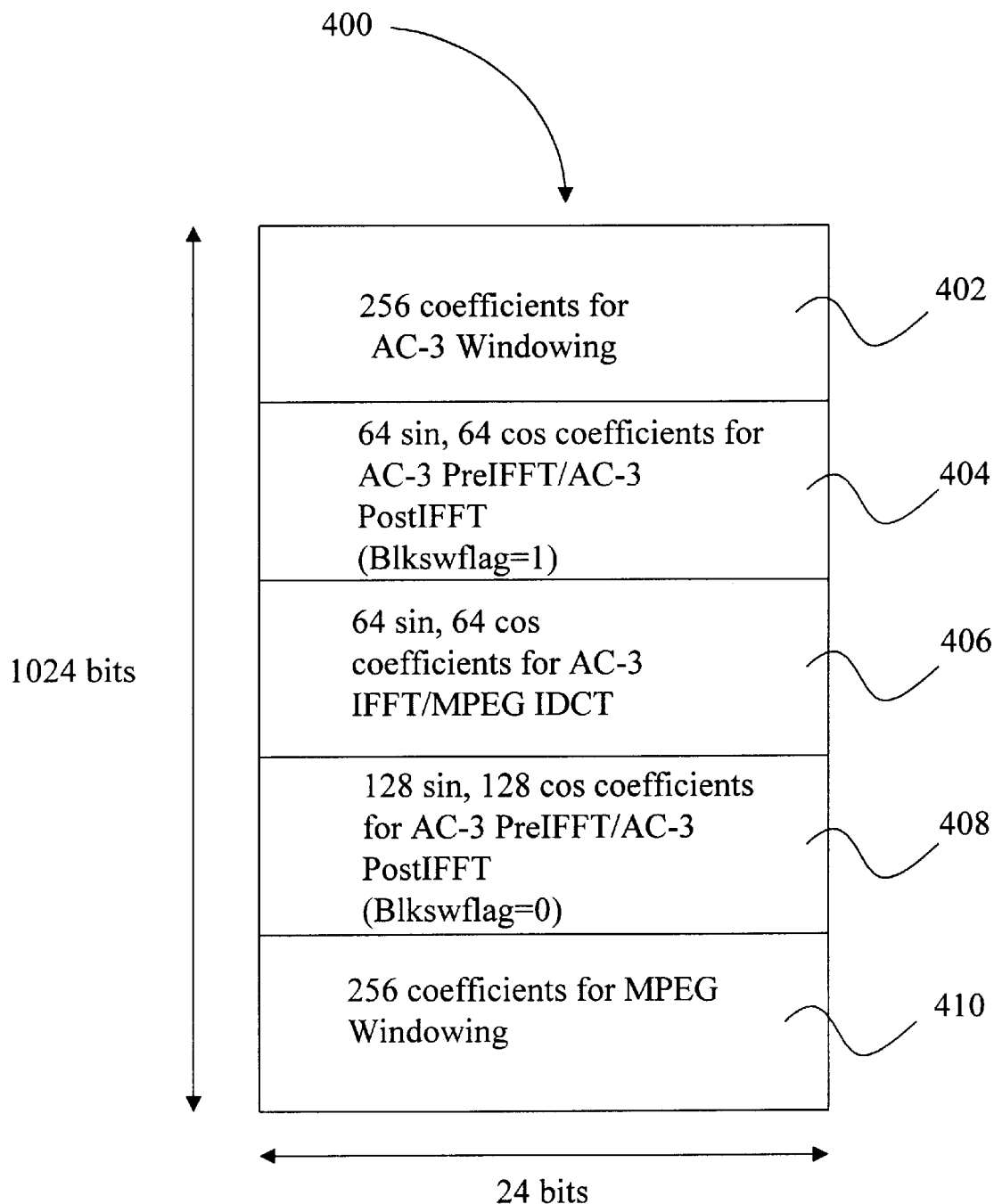
FIG. 8 is a block diagram of the ROM partitioning in accordance with a more preferred embodiment of the present invention.

FIG. 7 illustrates a preferred partitioning of ROM 15 in accordance with one embodiment of the present invention. As shown, a partition 105 provides 256 windowing coefficients to be employed in AC-3 decoding. A partition 107 provides 128 sine and cosine coefficients to be used in AC-3 pre- and post-IFFT processing. Next, the partition 115 contains 256 windowing coefficients required for MPEG windowing. Finally, partitions 109, 111, and 113 together provide coefficients for use in both the AC-3 IFFT step and the MPEG IDCT step. Partition 109 includes 16 sine coefficients and 16 cosine, partition 111 maintains the single value 0 (i.e., sin(0) or cos($\pi/2$)), and partition 113 contains the value 1 (i.e., cos(0) or sin($\pi/2$)).

This design very efficiently uses ROM storage space for the necessary MPEG and AC-3 matrixing and windowing coefficients. All coefficients necessary to perform MPEG sub-band synthesis are stored in partitions 109, 111, and 113 of ROM 15. The $N_{ik}$ values used in the matrixing step 228 of FIG. 3 are cosine values given by the following expression:

$$N_{ik}=\cos[\pi(16+i)*(2k+1)/64]$$

In this expression, i is a value between 0 and 63, and k is a value between 0 and 31. Thus, there are potentially 64 times 32 (or 2048) different cosine coefficients available. However, in this embodiment, these may be stored as 16 cosine values, 16 sine values, 0, and 1 (i.e., 34 distinct values). Many of the potential 2048 cosine values can be eliminated by recognizing that they duplicate one another. This can be understood by recognizing that cos(a)=cos(2n$\pi$+a), where n is any integer. Thus, every time the argument of the above cosine expression varies by a multiple of 2$\pi$, duplicate values are produced. As the cosine of 0, cosine of 2$\pi$, cosine of 4$\pi$, etc. all equal 1, the value of 1 is stored as a single coefficient. Also, because the cosine of $\pi/2$ as well as the cosine of 3$\pi/2$, etc. equals zero, the value zero is also stored as a separate coefficient.

Figure 6:
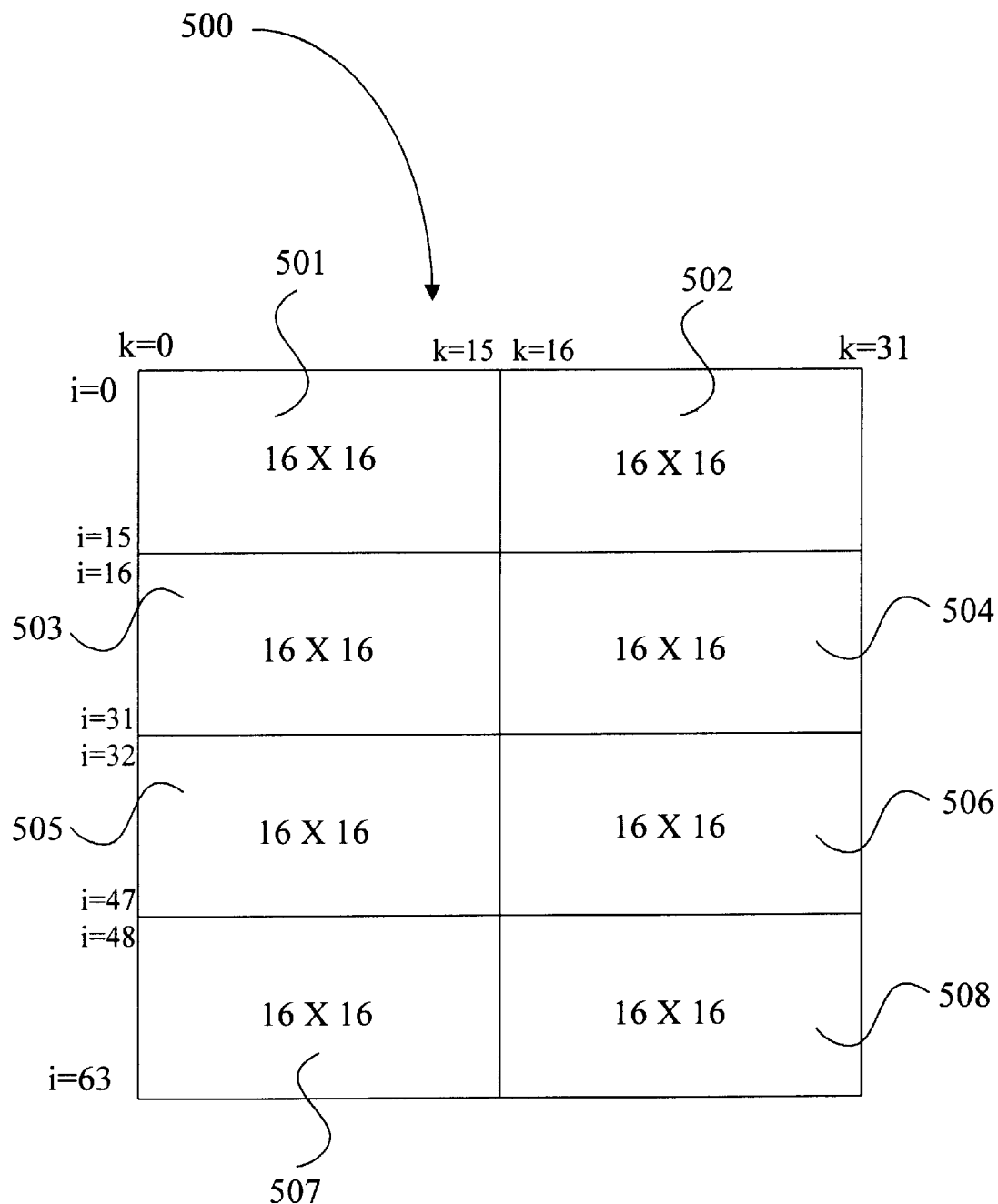
FIG. 6 is an array containing 2048 coefficients required for MPEG matrixing (IDCT).

FIG. 6 shows in block form an array 500 containing the 2048 coefficient values (or matrix elements) required for MPEG and AC-3 matrixing. The coefficients in array 500 are arranged to illustrate the trigonometric symmetries allowing the above mentioned reduction to be realized. In order to facilitate discussion, array 500 is divided into 8 blocks (501–508), each containing an array of 16×16 matrix elements. Reduction in the size of matrix 500 is facilitated by a realization that various matrix elements in the blocks each have a symmetrical relationship to the blocks in the top left block (block 501), i.e. they are either the same as or can be expressed as the negative of values in block 501. The symmetries are about i equal to 16, 32 and 48 and index (k) equal to 16.

By way of example, blocks 501 and 502 are symmetrical to each other about matrix elements having (index) k=16, but with a sign change. In other words, matrix elements having (index) k equal to 15 in block 501 and (index) k equal to 17 in block 502 are the same, except they are of opposite signs, i.e. the opposite of a "+" sign is a "−" sign and vice-versa. Furthermore, the matrix elements having (index) k equal to 14 in block 501 and (index) k equal to 18 in block 502 are the same, except they are of opposite signs and such symmetry continues to matrix elements having (index) k equal to 1 in block 501 and (index) k equal to 31 in block 502.

Similarly, blocks 501 and 503 are symmetrical to each other about matrix elements having (index) i=16, but with a sign change. Thus, matrix elements having (index) i equal to 15 in block 501 and (index) i equal to 17 in block 503 are the same, except they are of opposite signs. Blocks 503 and 505 are symmetrical to each other about matrix elements having (index) i=32, without a sign change. Block 507 is further symmetrical to block 505 about matrix elements having (index) i=48, without a sign change.

Similarly, blocks 502 and 504 are symmetrical to each other about matrix elements having (index) i=16, but with a sign change and blocks 506 and 508 are symmetrical to each other about matrix elements having (index) i=48, without a sign change. Finally, blocks 505 and 506, like blocks 501 and 502, are symmetrical to each other about matrix elements having (index) k=16, but without a sign change.

The above mentioned symmetries among the various blocks in array 500 reduce the size of the array from 2048 values to 256 values and was implemented first in Musicam, available from LSI Logic Corporation of Santa Clara, Calif.

Additional reductions in the number of coefficients can be obtained by employing certain trigonometric identities to reduce the number of coefficient values stored in ROM 15. By employing those identities, the relatively small number of coefficients stored in ROM 15 can be converted to the full complement of unique coefficients (before multiplication in data path 19). Specifically, the identities employed to reduce the total complement of coefficients to 16 cosine values and 16 sine values are the following:

$\cos(\pi-\theta) = -\cos\theta$
$\cos(\pi+\theta) = -\cos\theta$
$\cos(2\pi-\theta) = +\cos\theta$
$\cos(2\pi+\theta) = +\cos\theta$
$\cos(\pi/2-\theta) = +\sin\theta$
$\cos(\pi/2+\theta) = -\sin\theta$
$\cos(3\pi/2-\theta) = -\sin\theta$
$\cos(3\pi/2+\pi-\theta) = +\sin\theta$
$\cos(-\theta) = +\cos\theta$
$\sin(-\theta) = -\sin\theta$
$\cos(0) = 1$
$\sin(\pi/2) = 1$
$\cos(\pi/2) = 0$
$\sin(0) = 0$ For Example: i=1, k=0
$\cos 17\pi/64 = \cos(\pi/2 - 15\pi/64) = \sin 15\pi/64$ (stored value)

Using the above expressions, the 16 cosine value and 16 sine values stored in ROM 15 are the following:

| | | |
|---|---|---|
| $\sin \pi/64$ | $\sin 12\pi/64$ | $\cos 6\pi/64$ |
| $\sin 2\pi/64$ | $\sin 13\pi/64$ | $\cos 7\pi/64$ |
| $\sin 3\pi/64$ | $\sin 14\pi/64$ | $\cos 8\pi/64$ |
| $\sin 4\pi/64$ | $\sin 15\pi/64$ | $\cos 9\pi/64$ |
| $\sin 5\pi/64$ | $\sin 16\pi/64$ | $\cos 10\pi/64$ |
| $\sin 6\pi/64$ | 1 | $\cos 11\pi/64$ |
| $\sin 7\pi/64$ | $\cos \pi/64$ | $\cos 12\pi/64$ |
| $\sin 8\pi/64$ | $\cos 2\pi/64$ | $\cos 13\pi/64$ |
| $\sin 9\pi/64$ | $\cos 3\pi/64$ | $\cos 14\pi/64$ |
| $\sin 10\pi/64$ | $\cos 4\pi/64$ | $\cos 15\pi/64$ |
| $\sin 11\pi/64$ | $\cos 5\pi/64$ | $\cos 16\pi/64$ |

When these coefficients are retrieved, it may of course be necessary to change their signs (or perform other simple arithmetic manipulations) before multiplication with the appropriate sample value. The appropriate logic in the data path 19 can perform this operation. This may be achieved in the ROM addressing logic for example.

The number of windowing coefficients required for MPEG may also be reduced to save storage space in partition 115 of ROM 15. Particularly, the MPEG standard requires 512 windowing coefficients ($D_i$). These coefficients are listed in Table-3-B.3 at pages B-6 through B-8 of the MPEG document. In a preferred embodiment of the present invention, however, only 256 of these windowing coefficients are stored. This may be accomplished by eliminating those windowing coefficients having negative values. It has been determined that half of the windowing coefficients listed in Table 3-B.3 of the MPEG document are simple negatives of the other values. In other words, there are only 256 distinct values within the standard table of windowing coefficients.

Regarding the AC-3 windowing coefficients stored in partition 105 of ROM 15, these are simply the values provided in Table 7-33 at page 77 of the AC-3 standard document. As the values provided in that table are each distinct, each of them must be stored in ROM 15.

Partition 107 of ROM 15 contains 128 sine coefficients and 128 cosine coefficients. These coefficients are used in the pre-IFFT and post-IFFT AC-3 processing steps. As will be explained in more detail below, AC-3 has two implementations: a 512-sample transform and a 256-sample transform. In each case, 128 unique sine coefficients and 128 unique cosine coefficients are required for the pre-IFFT step. The post-IFFT step requires exactly the same 128 sine coefficients and 128 cosine coefficients. Unfortunately, the coefficients employed in the 512-sample transform are different those employed in the 256-sample transform. However, it has been recognized that there is a simple relationship between the 512-sample transform coefficients and the 256-sample transform coefficients. Specifically, the pre- and post-IFFT 512-sample transform coefficients represented by $\sin\theta$ or $\cos\theta$ have corresponding 256-sample transform coefficients represented by $\sin 2\theta$ or $\cos 2\theta$. In a preferred implementation, only the 512-sample transform coefficients are stored. When 256-sample transform coefficients are to be employed, the following trigonometric identities are employed:

$\cos(2\theta) = 2\cos^2\theta - 1$
$\sin(2\theta) = 2\sin\theta\cos\theta$

While a few additional cycles may be required to calculate the 256-sample transform coefficients, the required storage space in ROM 15 is greatly reduced.

The AC-3 process also includes an IFFT step performed after the pre-IFFT step and before the post-IFFT step. As indicated in pages 74 and 75 of the AC-3 document, a total of as many as 1024 sine values and 1024 cosine values are employed in the 512-sample transform implementation and the 256-sample transform implementation. As with the pre- and post-IFFT coefficients, however, $\sin\theta$ and $\cos\theta$ values of the 512-sample transform correspond to $\sin 2\theta$ and $\cos 2\theta$ of the 256-sample transform. Thus, only the values for the 512-sample transform must be stored. Further, it has been recognized that many of the 1024 sine values and 1024 cosine values are redundant. Specifically, it has been determined that the trigonometric relationships used to reduce the number of MPEG IDCT coefficients can also employed to reduce the AC-3 IFFT coefficients. In fact, it has been found that 16 sine coefficients and 16 cosine coefficients stored in partition 109 uniquely define all sine and cosine coefficients employed in the IFFT step of the 512-sample transform. Therefore, the amount of ROM space required to store MPEG IDCT coefficients and AC-3 IFFT coefficients is very greatly reduced. This greatly reduces the size of the audio core and allows very efficient accessing of the available values stored in ROM 15.

In its effort to optimize the ROM size, the present invention realizes that it is important to strike a balance between the reduction in the ROM size and the size of the address logic required to use the coefficients stored in the optimized ROM in a decoding algorithm. A highly optimized ROM, where the minimum possible coefficient values are stored in the ROM, may require a relatively complicated address logic to use those coefficients in an algorithm and thereby slows down the decoding process. The decoding process may undesirably slow down by a time value that is of the order of a few nanoseconds, which is significant considering the current chip technology is moving to faster devices that operate at high frequencies, e.g., 54 MHz and above. Thus, a highly optimized ROM may be implemented at the expense of a relatively large address logic, which undesirably slows down the decoding process.

FIG. 7 shows the partitioning of a ROM 400, according to a more preferred embodiment of the present invention. ROM 400 includes: (a) a first partition 402 for storing a first set of constants which are windowing coefficients for AC-3 decoding, (b) a second partition 404 for storing a second set of constants which are constants used for pre-IFFT and post-IFFT steps of AC-3 decoding (Blkswflag=1), (c) a third partition 406 for storing a third set of constants which are both IDCT coefficients for MPEG decoding and IFFT coefficients for AC-3 decoding, (d) a fourth partition 408 for storing a fourth set of constants which are constants used for pre-IFFT and post-IFFT steps of AC-3 decoding (Blkswflag=0), and (e) a fifth partition 410 for storing a fifth set of constants which are windowing coefficients for MPEG decoding.

As shown in FIG. 7, the first and fifth partitions 402 and 410 store 256 windowing coefficients for AC-3 decoding and 256 windowing coefficients for MPEG decoding, respectively. Second partition 404 stores 64 sine and 64 cosine coefficients for AC-3 pre- and post-IFFT steps (Blkswflag=1). Fourth partition 408 stores 128 sine and 128 cosine coefficients for AC-3 pre- and post-IFFT steps (Blkswflag=0). Third partition 406 stores a reduced set of 64 unique sine constants and 64 unique cosine coefficients (as opposed to 2048 constants specified for IDCT and 16,384 constants specified for IFFT), thereby greatly reducing the amount of storage space required in the ROM.

In the case where blkswflag equal to 1, for AC-3 pre- and post-IFFT steps, coefficients of the form $\sin 2\theta$ and $\cos 2\theta$ are required and in the case where blkswflag equal to 0, coefficients of the form $\sin \theta$ and $\cos \theta$ are required. If only $\sin \theta$ and $\cos \theta$ coefficients are stored in the ROM, then by using these values and the appropriate trigonometric identities, the necessary values of $\sin 2\theta$ and $\cos 2\theta$ can be calculated. As a result, the need to store $\sin 2\theta$ and $\cos 2\theta$ values in the ROM is eliminated and the ROM size is reduced.

In order to calculate Zr[k] or Zi[k] (mentioned below), however, a value of $\sin 2\theta$ or $\cos 2\theta$ value is calculated from the trigonometric identities:

$$\sin 2\theta = 2 \sin \theta \cos \theta$$

$$\cos 2\theta = (2 \cos^2 \theta - 1)$$

The computation of $\sin 2\theta$ from $\sin \theta$ and $\cos \theta$ takes 5 additional clock cycles and computation of $\cos 2\theta$ from $\sin \theta$ and $\cos \theta$ takes 6 additional clock cycles. Thus, each Zr[k] or Zi[k] calculation involves an additional overhead of (5+6)*(2)=22 clock cycles. Thus a substantial amount of time is expended during decoding in comparison to the savings realized by the reduced ROM size by not storing $\sin 2\theta$ and $\cos 2\theta$ values. Therefore, in the preferred implementation of ACORE, the ROM contains $\sin 2\theta$, $\cos 2\theta$ and $\sin \theta$, $\cos \theta$ values to reduce the clock cycles and quickly decode the audio frames.

It is worth noting that in the more preferred embodiment, partition 406 was expanded from its minimum possible value 34 distinct coefficient values to 128 non-distinct coefficients (64 cosine and 64 sine values) for both AC-3 IFFT and MPEG matrixing. As mentioned above, it is important to strike a balance between the reduction in the ROM size and the size of the address logic required to use the coefficients stored in the optimized ROM in a decoding algorithm. Storing 34 coefficients in partition 406 requires complex addressing logic and the AC-3 butterfly, which contains the instructions for using the coefficients during decoding, would require additional hard coding to use the 34 coefficients. By storing 128 coefficients, the complexity of the addressing logic is significantly reduced and the time to access the coefficients during a decoding cycle are greatly reduced.

H. AC-3 Matrixing and Windowing

Figure 9:
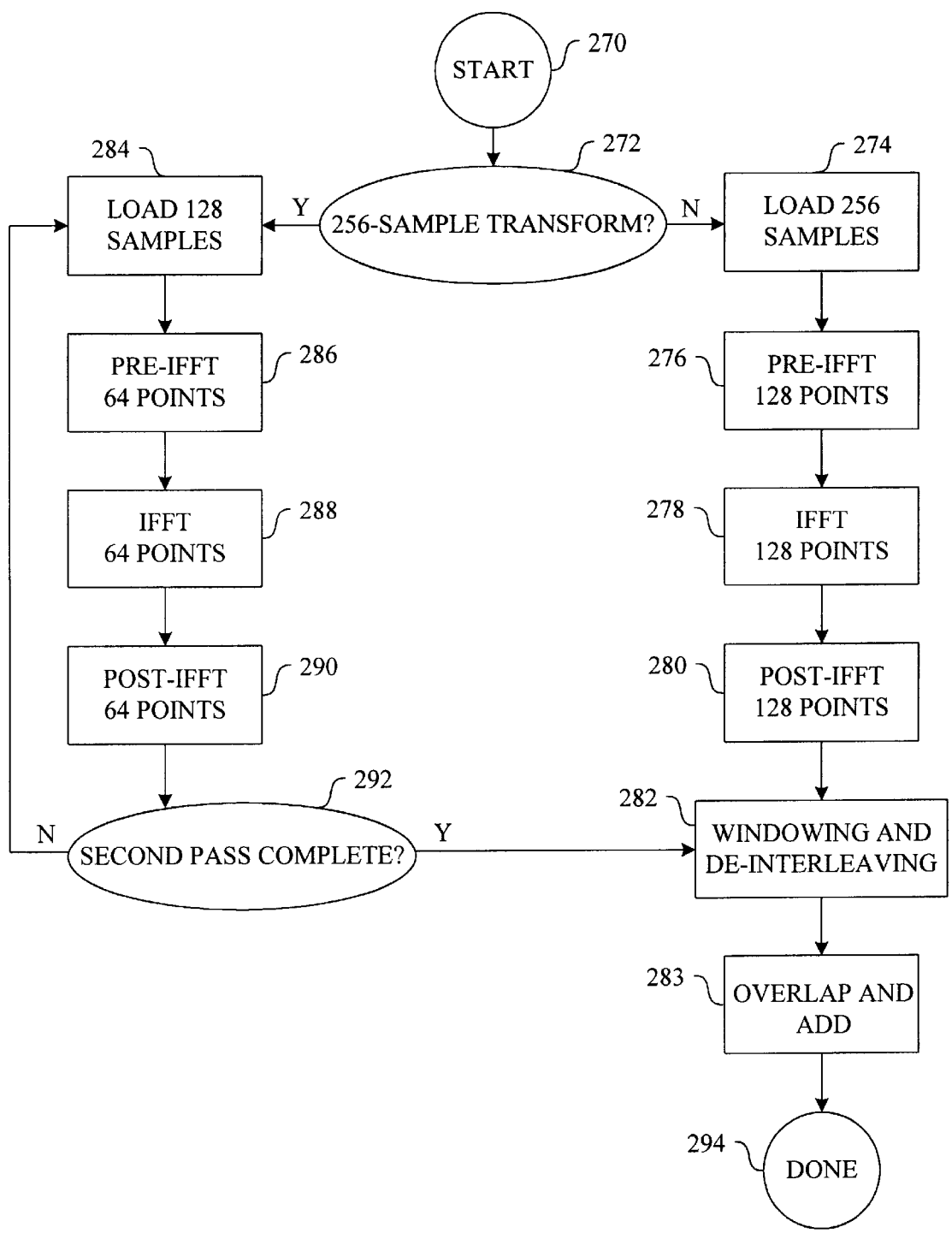
FIG. 9 is a process flow diagram of the principle AC-3 matrixing and windowing steps.

As explained in the AC-3 document, AC-3 data may be encoded in two ways: as a 256-sample transform and as a 512-sample transform. The algorithm for matrixing and windowing AC-3 data treats these two transforms slightly differently as shown in FIG. 9. As shown, the process begins at 270 and then a decision step 272 determines whether the data is to be decoded according to a 256-sample transform. Assuming that the answer to this question is no (i.e., a 512-sample transform is to be employed), the system proceeds to a step 274 where 256 samples are loaded for decoding. If, on the other hand, decision step 272 determines that a 256-sample transform is to be employed, the system proceeds to step 284 where only 128 samples are loaded for processing. Thereafter, three inverse fast fourier transform steps are performed before the system loops back to step 284 where a second 128 samples are loaded and processed. This should be contrasted to the 512-sample transform situation, in which only one pass through the inverse fast fourier transform steps is performed. It should be noted that in either case, 256 values are processed prior to transitioning to a windowing and de-interleaving step 282.

In the case of the 256-sample transform, 256 samples are initially provided to the decoder. On the first pass, 128 even values from these 256 input values are processed by the inverse fast fourier transforms steps. In the second pass, the 128 odd values are similarly processed. In case of the 512-sample transform, all 256 sample values are processed in a single pass.

Focusing now on the 512-sample transform, a step 276 performs a pre-IFFT complex multiplication step after the 256 samples have been loaded at step 274. This process is described at page 73 of the AC-3 document in section 7.9.4.1(2). As described, 128 intermediate values designated as "Z[k]" are generated in this step. Each of those values has a real component (Zr) and an imaginary component (Zi). These values are stored in partition 209 of input RAM 201. The expression for these values is given as follows:

$$Z[k] = Zr[k] + j * Zi[k]$$

$$Zr[k] = (X[256-2k-1]*(-\cos(2\pi(8k+1)/4096)) - X[2k]*(-\sin(2\pi(8k+1)/4096)))$$

$$Zi[k] = (X[2k]*(-\cos(2\pi(8k+1)/4096)) + X[256-2k-1]*(-\sin(2\pi(8k+1)/4096)))$$

In the above expressions, k varies from 0 to 127 and X is the input sample value.

The Z[k] values are calculated as follows. State machine 27 in control logic block 9 provides current state, secondary state and loop count information to input RAM interface 17. Based upon this information, input RAM interface 17 extracts the relevant samples (X) from input RAM 201 (partition 207). The input samples values (X) are chosen as required by the above expression for Z[k]. In addition, control logic block 9 current state, secondary state and loop count information to ROM addressing logic unit 13 which then extracts the appropriate values of the cosine and sine coefficients from ROM 15 (partition 107). The sample values extracted by input RAM interface 17 and the coefficient values extracted by ROM addressing logic unit 13 are provided to data path 19 where they are multiplied as required by the above expression.

As each of the Z[k] are generated, they are written to input RAM 201 at partition 209. Note that each Z[k] value is stored as two components: a real component Zr and an imaginary component Zi.

After the pre-IFFT step is completed (step 276 of FIG. 9), an IFFT step 278 must be performed. After that step has been completed, according to the AC-3 standard, a post-IFFT step 280 must be performed.

The IFFT step for the 512-sample transform is described in the AC-3 document in section 7.9.4.1(3). As shown there, 128 values of z[n] are generated. These values are generated according following expression:

$$z[n]=\Sigma((Zr[k]+j*Zi[k])*(\cos(\pi kn/64)+j*\sin(\pi kn/64)))$$

In this expression each of the 128 values of z[n] are obtained by summing from k=0 to k=127.

As can be seen, each of the 128 values of z[n] contains a real component and an imaginary component. In the preferred implementation, the real component is calculated first, independently of the imaginary component. Specifically, the real component of each z[n] is generated by accumulating 128 products of Z[k] (retrieved from input partition 209 of RAM 201 of FIG. 10B) and appropriate sine/cosine coefficients (retrieved from partitions 109, 111, and 113 of ROM 15). The Z[k] and coefficient values are multiplied in multiplier 143 of data path 19 and accumulated in accumulator 145 also of data path 19. The resulting real value z[n] is stored in an appropriate location in input partition 209 or 211 of the input RAM 201. Thereafter, the imaginary component of z[n] is generated in an analogous manner and stored in another appropriate location in input RAM 201 (either partition 209 or 211, for example). Partitions 209 and 211 of the input RAM 201 are used alternately for intermediately results storage.

At this point, the post IFFT step is performed on the values computed in the IFFT step. The AC-3 post-IFFT step for the 512-sample transform is described in section 7.9.4.1 (4) of the AC-3 document. As shown there, a complex value y[n] is generated for 128 values of n (n varying from 0 to 127). The expression for the post-IFFT step is as follows:

$$y[n]=yr[n]+j*yi[n]$$

$$yr[n]=zr[n]*(-\cos(\pi(8k+1)/2048))-zi[n]*(-\sin(\pi(8k+1)/2048))$$

$$yi[n]=zi[n]*(-\cos(\pi(8k+1)/2048))+zr[n]*(-\sin(\pi(8k+1)/2048))$$

In the preferred implementation of this invention, a set of real and imaginary components of each of value of z[n] generated as described above, are multiplied with the appropriate cosine/sine coefficients from ROM 15 (by multiplier 143) in the post-IFFT step. The resulting real and imaginary components of y[n] are then written back to input RAM 201 (partition 211). Writing the values of y[n] to the appropriate addressing with a input RAM 201 is controlled by input RAM interface 17.

After the post-IFFT step 280 has been performed (i.e., all 128 values of z[n] have been calculated and written to partition 211), the AC-3 standard requires that two additional steps be performed before the process is completed. Specifically, a windowing/deinterleaving step 282 followed by an overlap and add step 283 must be performed before the process is completed at 294. These steps are described in sections 7.9.4.1.(5) and (6), respectively, of the AC-3 document. In a preferred implementation of the present invention, these distinct steps are combined in to a single step to improve efficiency of the audio core.

As specified in AC-3 document, the windowing and deinterleaving step generates eight values of "x" for each value of n, with n varying from 0 to 63. The expressions for x are as follows:

$$x[2n]=-yi[64+n]*w[2n]$$

$$x[2n+1]=yr[64-n-1]*w[2n+1]$$

$$x[64+2n]=-yr[n]*w[64+2n]$$

$$x[64+2n+1]=yi[64-n-1]*w[64+2n+1]$$

$$x[128+2n]=-yr[32+n]*w[128-2n-1]$$

$$x[128+2n+1]=yi[32-n-1]*w[128-2n-2]$$

$$x[192+2n]=yi[n]*w[64-2n-1]$$

$$x[192+2n+1]=-yr[64-n-1]*w[64-2n-2]$$

In the above expressions, yr[n] is the real component of y[n], yi[n] is the imaginary component of y[n], and w[n] is a windowing coefficient (stored in partition 402 of ROM 400) and specified in Table 7-33 at 77 of the AC-3 document.

While the AC-3 standard indicates 512 values of x (eight values of x generated for each of 64 values of n) be generated in the windowing and de-interleaving step before proceeding to the overlap and add step, a preferred implementation of the present invention combines all these steps.

According to the AC-3 Document (section 7.9.4.1 (6)), the overlap and add step generates 256 PCM values and 128 delay values according to the following expressions:

$$PCM[n]=2(x[n]+\text{delay}[n])$$

$$\text{delay}[n/2]=x[256+n]$$

The delay value is provided from the previous calculation 256 PCM values (i.e., the PCM values calculated from the previous set of 256 samples loaded into partition 207 or input RAM 201). Thus, the delay value calculated from the above expression is stored for use only when the audio core processes the next 256 input samples.

It has been found that the above expression for PCM values is in error, and the appropriate expression for the PCM values is actually the following:

$$pcm[2n]=2*((-yi[n]*w[2n])+(\text{delay}[n]*w[N/2-2n-1]))$$

$$pcm[2n+1]=2*((-yr[N/8-n-1]*w[2n+1])+(\text{delay}[n+1]*w[N/2-2n-2]))$$

$$pcm[N/4+2n]=2*((=yr1[n]*w[N/4+2n]+(\text{delay}[N/4+n]*w[N/4-2n-1]))$$

$$pcm[N/4+2n=1]=2*((yi1[N/8-n-1]*w[N/4+2n+1])+(\text{delay}[N/4+n+1]*w[N/4+n+1]))$$

Similarly, the actual expression for the delay values is as follows:

$$\text{delay}[i]=x[64+i], \text{ for } i=0 \text{ to } 127$$

As shown, 256 PCM values are generated from the 512 x values produced in the windowing and deinterleaving step. The PCM values are written to output RAM 7 (through output RAM interface 16) to conclude the audio core's handling of the AC-3 data. As indicated above, the delay values are loaded into partition 213 of input RAM 201. As shown in the above expression, these delay values are simply the remaining 128 values of x[n] that were not used to generate the 256 PCM values output in the previous step. Thus, when the decoding process begins, there will be no delay values (i.e., each delay [n] will be equal to 0). Only after the first 256 input samples have been used to generate 256 PCM output samples, will delay [n] values be available for calculation of the next generation of PCM values.

Note that when the delay[n] values are generated, they are written to input RAM 201 at partition 213 with the aid of input RAM interface 17. Note also that partition 213 must be sufficiently large to store the full complement of delay[n] values for each channel being processed. This is because the delay[n] values must be stored through the whole cycle of IFFT, windowing, and overlap before they can be used. Only at that time are they overwritten with the new values of delay[n].

It should be understood that while the expressions for overlap and add in the AC-3 standard suggest that 256 unique PCM values and 256 unique delay values are generated in the overlap and add step, the audio core implementation of this invention may actually generate 256 unique PCM values but store only 128 delay values, in this step. This is achieved by storing only 128 values of yr2[n] and yi2[n], i.e., store yr2[64], yr2[65], . . . , yr2[127], yi2[64], yi2[65], . . . , yi2[127], as delay values, in partition 213 of input RAM 201. It should be understood, of course, that each of these stored delay values is used twice in calculating subsequent PCM values.

Implementation of the 256-sample transform is similar to implementation of the 512-sample transform. The main difference is that the original 256 samples loaded into the input RAM are divided into "even" samples and "odd" samples for separate processing. As indicated in section 7.9.4.2(1) of the AC-3 standard, the even samples are designated "X1", and the odd samples are designed "X2". These values are loaded in step 284 of the FIG. 9 process.

While the AC-3 document may suggest that the even and odd samples be processed in separate iterations (as indicated at step 292 of 10), the preferred implementation of the present invention performs each IFFT step for both the even and odd values before proceeding to the next IFFT step.

The pre-IFFT step (step 286 of FIG. 9) of the 256-sample transform is described at section 7.9.4.2(2) of the AC-3 standard. As indicated therein, the calculation of Z1[k] (for even values) and Z2[k] (for odd values) employs the same the expression as used to generate Z[k] in the 512-sample transform with the exception of that 64 values of Z1[k] and 64 values Z2[k] are generated, as opposed to 128 values of Z[k]. The resulting values of Z1[k] and Z2[k] are written back to input RAM 201 as described above in case of the Z[k] values.

IFFT step (step 288 of FIG. 9) and post-IFFT step (step 290 of FIG. 9)—described at section 7.9.4.2(3) and (4) of the AC-3 documents—parallel the corresponding steps for the 512-sample transform. The subsequent windowing and overlap steps are also performed as in the case of the 512-sample transform (see section 7.9.4.2(5) and (6) of the AC-3 document).

I. Other Embodiments

Although the foregoing invention has been described in some detail for purposes of clarity of understanding, it will be apparent that certain changes and modifications may be practiced within the scope of the appended claims. For example, while the video decoder core of this invention preferably implements specific functions in accordance the MPEG, MPEG-2, and AC-3 standards, there is in principal no reason why the audio cores of this invention can not be employed with other audio decoding algorithms which do not necessarily adhere to the MPEG, MPEG-2, or AC-3 protocols. Therefore, the present embodiments are to be considered as illustrative and not restrictive, and the invention is not to be limited to the details given herein, but may be modified within the scope of the appended claims.

What is claimed is:

1. A digital audio decoder provided on an integrated circuit for decoding encoded audio data, the audio decoder comprising:

digital audio decoder circuitry arranged to decode both MPEG encoded audio input signals and AC-3 encoded audio input signals and output decoded audio signals;

a ROM accessible by the digital audio decoder circuitry the ROM having stored therein constants used by the digital audio decoder circuitry to perform some functions of both MPEG audio decoding and AC-3 audio decoding, wherein a subset of the constants are shared constants used for both MPEG audio decoding and AC-3 audio decoding.

2. The digital audio decoder of claim 1, wherein the ROM stores constants including at least (i) matrixing constants for AC-3 and MPEG audio decoding algorithms and (ii) windowing constants for AC-3 and MPEG audio decoding algorithms.

3. The digital audio decoder of claim 1, wherein the ROM includes multiple partitions, and wherein in a first partition stores windowing constants for at least one of MPEG audio decoding and AC-3 audio decoding.

4. The digital audio decoder of claim 1, wherein the ROM includes multiple partitions, and wherein in a second partition stores pre-IFFT constants and post-IFFT constants for AC-3 audio decoding.

5. The digital audio decoder of claim 1, wherein the ROM includes multiple partitions, and wherein in a third partition stores the shared constants used as both IDCT constants for MPEG decoding and IFFT constants for AC-3 decoding.

6. The digital audio decoder of claim 5, wherein third partition contains at most 128 constants.

7. The digital audio decoder of claim 5, wherein third partition contains 128 constants.

8. The digital audio decoder of claim 5, wherein third partition contains 34 unique constants.

9. The digital audio decoder of claim 1, wherein the ROM includes 256 windowing constants for AC-3 decoding, 256 windowing constants for MPEG decoding, 256 constants for blkswflag=0 pre-IFFT and post-IFFT steps of AC-3 decoding, 128 constants for blkswflag=1 pre-IFFT and post-IFFT steps of AC-3 decoding, and 128 constants for both IFFT in AC-3 decoding and IDCT in MPEG decoding.

10. The digital audio decoder of claim 1, further comprising a ROM interface for controlling reading data from the ROM.

11. A computer readable medium on which is stored a digital audio decoder design for decoding encoded audio input signals, the digital audio decoder design comprising a hardware layout having:

data path circuitry for performing some functions of both MPEG audio decoding and AC-3 audio decoding using encoded audio input signals and outputting decoded audio signals; and a ROM accessible by the digital audio decoder circuitry the ROM having stored therein constants used by the data path circuitry in some functions of both MPEG audio decoding and AC-3 audio decoding, wherein a subset of the constants are shared constants used for both MPEG audio decoding and AC-3 audio decoding.

12. The computer readable medium of claim 11, wherein the decoding functions include matrixing and windowing of MPEG and AC-3 audio decoding algorithms.

13. The computer readable medium of claim 11, wherein the hardware layout further comprises a ROM interface for controlling reading data from the ROM.

14. The computer readable medium of claim 11, wherein the ROM stores constants including at least (i) matrixing constants for AC-3 and MPEG audio decoding algorithms and (ii) windowing constants for AC-3 and MPEG audio decoding algorithms.

15. The computer readable medium of claim 11, wherein the ROM includes multiple partitions, and wherein in a first partition stores windowing constants for at least one of MPEG audio decoding and AC-3 audio decoding.

16. The computer readable medium of claim 11, wherein the ROM includes multiple partitions, and wherein in a second partition stores pre-IFFT constants and post-IFFT constants for AC-3 audio decoding.

17. The computer readable medium of claim 11, wherein the ROM includes multiple partitions, and wherein in a third partition stores the shared constants used as both IDCT constants for MPEG decoding and IFFT constants for AC-3 decoding.

18. The computer readable medium of claim 11, wherein the third partition contains at most 128 constants.

19. The computer readable medium of claim 11, wherein the third partition contains 128 constants.

20. The computer readable medium of claim 11, wherein the third partition contains 34 unique constants.

21. The computer readable medium of claim 11, wherein the ROM includes 256 windowing constants for AC-3 decoding, 256 windowing constants for MPEG decoding, 256 constants for blkswflag=0, pre-IFFT and post-IFFT steps of AC-3 decoding, 128 constants for blkswflag=1, pre-IFFT and post-IFFT steps of AC-3 decoding, and 128 constants for both IFFT in AC-3 decoding and IDCT in MPEG decoding.

22. A digital audio decoder provided on an integrated circuit for decoding encoded audio input signals, the digital audio decoder comprising hardware means including means for performing some functions of both MPEG audio decoding and AC-3 audio decoding on the encoded audio input signals and outputting decoded audio signals; and means for storing constants which stores constants used in the MPEG-2 and AC-3 audio decoding algorithms implemented on the means for performing, wherein a subset of the constants are shared constants used for both MPEG audio decoding and AC-3 audio decoding.

23. The audio core of claim 22, wherein the decoding functions include matrixing and windowing of MPEG and AC-3 audio decoding algorithms.

24. The audio core of claim 22, wherein wherein the means for storing includes multiple partitions, and wherein in a first partition stores windowing constants for at least one of MPEG audio decoding and AC-3 audio decoding.

25. The audio core of claim 22, wherein wherein the means for storing includes multiple partitions, and wherein in a second partition stores pre-IFFT constants and post-IFFT constants for AC-3 audio decoding.

26. The audio core of claim 22, wherein wherein the means for storing includes multiple partitions, and wherein in a third partition stores the shared constants used as both IDCT constants for MPEG decoding and IFFT constants for AC-3 decoding.

27. The audio core of claim 26, wherein third partition contains at most 128 constants.

28. The audio core of claim 26, wherein third partition contains 128 constants.

29. The audio core of claim 26, wherein third partition contains 34 unique constants.

30. The audio core of claim 22, wherein the means for storing includes 256 windowing constants for AC-3 decoding, 256 windowing constants for MPEG decoding, 256 constants for blkswflag=0 pre-IFFT and post-IFFT steps of AC-3 decoding, 128 constants for blkswflag=1 pre-IFFT and post-IFFT steps of AC-3 decoding, and 128 constants for both IFFT in AC-3 decoding and IDCT in MPEG decoding.

31. The audio core of claim 22, further comprising means for interfacing and controlling reading data from the means for storing.

32. The audio core of claim 22, wherein the means for storing stores constants including at least (i) matrixing constants for AC-3 and MPEG audio decoding algorithms and (ii) windowing constants for AC-3 and MPEG audio decoding algorithms.

* * * * *